(12) United States Patent
Hatada

(10) Patent No.: US 10,921,977 B2
(45) Date of Patent: Feb. 16, 2021

(54) INFORMATION PROCESSING APPARATUS AND INFORMATION PROCESSING METHOD

(71) Applicant: FUJITSU LIMITED, Kawasaki (JP)

(72) Inventor: Koki Hatada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/263,131

(22) Filed: Jan. 31, 2019

(65) Prior Publication Data

US 2019/0243521 A1 Aug. 8, 2019

(30) Foreign Application Priority Data

Feb. 6, 2018 (JP) .............................. JP2018-019690

(51) Int. Cl.
*G06F 3/0488* (2013.01)
*G06F 3/01* (2006.01)
*G06F 3/041* (2006.01)

(52) U.S. Cl.
CPC ............ *G06F 3/0488* (2013.01); *G06F 3/017* (2013.01); *G06F 3/0412* (2013.01)

(58) Field of Classification Search
CPC ...... G06F 3/0488; G06F 3/0412; G06F 3/017; G06F 3/0425; G06F 3/048
See application file for complete search history.

(56) References Cited

U.S. PATENT DOCUMENTS

| 10,001,817 | B2* | 6/2018 | Zambetti | G06F 3/0362 |
| 10,063,603 | B2* | 8/2018 | Nelson | G06F 40/197 |
| 10,248,880 | B1* | 4/2019 | Provencher | G06K 9/344 |
| 10,331,330 | B2* | 6/2019 | Petrov | G06F 3/0488 |
| 2007/0050726 | A1* | 3/2007 | Wakai | G06F 3/0486 715/769 |
| 2009/0228841 | A1 | 9/2009 | Hildreth | |
| 2010/0138763 | A1* | 6/2010 | Kim | G06F 1/1626 715/765 |
| 2010/0251189 | A1* | 9/2010 | Jaeger | G06F 3/04883 715/863 |
| 2010/0313124 | A1* | 12/2010 | Privault | G06F 3/04812 715/702 |
| 2010/0313158 | A1* | 12/2010 | Lee | G06F 3/04883 715/769 |
| 2013/0055129 | A1* | 2/2013 | Lee | H04N 21/4312 715/769 |

(Continued)

FOREIGN PATENT DOCUMENTS

JP 2013-145451 7/2013
JP 2014-099184 5/2014

*Primary Examiner* — Ibrahim A Khan
(74) *Attorney, Agent, or Firm* — Fujitsu Patent Center

(57) ABSTRACT

An information processing apparatus includes a memory and a processor coupled to the memory. The processor is configured to perform a first operation for a first object that is displayed on a screen. The processor is configured to display a third object on the screen in association with the first object after performing the first operation for the first object, wherein the third object represents the first operation. The processor is configured to superimpose the third object on one of at least one second object that is displayed on the screen. The processor is configured to apply the first operation to the one of at least one second object after superimposing the third object on the one of at least one second object.

14 Claims, 13 Drawing Sheets

(56) References Cited

U.S. PATENT DOCUMENTS

| | | | | |
|---|---|---|---|---|
| 2013/0162574 A1* | 6/2013 | Kobayashi | .............. | H04M 1/67 |
| | | | | 345/173 |
| 2013/0219341 A1* | 8/2013 | Lee | ....................... | G06F 3/0482 |
| | | | | 715/835 |
| 2014/0165012 A1* | 6/2014 | Shen | ..................... | G06F 9/4451 |
| | | | | 715/863 |
| 2014/0368456 A1* | 12/2014 | Sakai | ....................... | G06F 3/041 |
| | | | | 345/173 |
| 2015/0199020 A1* | 7/2015 | Hatada | ................... | G06F 3/017 |
| | | | | 345/158 |
| 2016/0117300 A1* | 4/2016 | Hatada | ................... | G06F 16/93 |
| | | | | 715/256 |
| 2016/0191669 A1* | 6/2016 | Hatada | ............... | H04L 41/0873 |
| | | | | 709/220 |
| 2019/0243521 A1* | 8/2019 | Hatada | ................... | G06F 3/017 |

\* cited by examiner

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2018-019690, filed on Feb. 6, 2018, the entire contents of which are incorporated herein by reference.

FIELD

The embodiments discussed herein are related to an information processing apparatus and an information processing method.

BACKGROUND

In recent years, as the projectors and large-sized displays have been distributed, techniques utilizing various places of space as displays are being used widely. For example, the display screen of a terminal such as a smart phone or a tablet terminal carried by a user may be displayed on a display at the corresponding place so that a plurality of persons shares the screen.

Further, multiple users share an object displayed on a large-sized display screen to perform a meeting or to present ideas while freely moving or operating the object. The object here is information displayed on the display screen. The object includes information such as, for example, sentences, images, icons, stickies, and notes. Further, each object may accept operations by the user such as movement, a change of orientation or size, deletion, and edition. In addition, the display screen may be shared between places by connecting multiple places through, for example, a communication network, to acquire information even from a remote place in addition to a single place.

As a technique of sharing the display screen, for example, the wall or a table may be provided with the function of a display or a touch panel and the screen of a terminal device may be displayed thereon to digitize a space where information is easily exchanged with another person. The technique of digitizing the space may be called a space user interface (UI). When the technique of digitizing the space is used, in order to express an idea of each person, a situation may be considered in which objects including multiple digital stickies are generated in the space where the screen is displayed, and the objects are organized. An operator performs an input by, for example, an electronic pen or an input by touching a touch panel.

It may be considered that the same operation is repeatedly performed with respect to the same type of objects in a situation where multiple objects are generated by performing the operation on the display screen shared by multiple persons. For example, a situation may be considered in which when multiple persons present ideas and multiple ideas are then created, the ideas are represented as the objects which are classified and grouped to perform color segmentation, a deletion, or a movement for each group. In this case, a batch operation on objects that belong to a specific group is an operation of repeatedly performing the same operation for each of a plurality of ideas included in the specific group.

When a repeating process of the same operation on a plurality of objects is performed as described above, the following method may be considered as a method of simplifying the operation. For example, there is a method of selecting several objects to be processed in advance and collectively operating the selected object. Further, as another method, there is a method of selecting a target object by switching the operation mode to a mode of performing a predetermined operation with respect to the selected object.

There is a technique in the related art that changes sharing setting depending on a location or a state of an operator, which is detected in a sensor disposed at an edge of the screen. In addition, there is also a technique in the related art that operates an image object by recognizing the gesture of the operator.

Related techniques are disclosed in, for example, Japanese Laid-open Patent Publication No. 2013-145451, and Japanese Laid-open Patent Publication No. 2014-099184.

SUMMARY

According to an aspect of the present invention, provide is an information processing apparatus including a memory and a processor coupled to the memory. The processor is configured to perform a first operation for a first object that is displayed on a screen. The processor is configured to display a third object on the screen in association with the first object after performing the first operation for the first object, wherein the third object represents the first operation. The processor is configured to superimpose the third object on one of at least one second object that is displayed on the screen. The processor is configured to apply the first operation to the one of at least one second object after superimposing the third object on the one of at least one second object.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The techniques in the related art described above have a problem in that it may be difficult to enhance operation efficiency. For example, in the case of a technique that collectively performs the operation with respect to the selected object, the operation mode may be switched to a selection mode of selecting the object in order to perform the selection, and as a result, the operation may become complicated. As a result, there is a concern that the entire operation efficiency of the processing using the screen may deteriorate. Even with a technique of switching the operation mode in advance to perform the operation on each target object, a trouble of changing the operation mode in advance increases, and the operation becomes complicated. In addition, when the mode is changed, a procedure of returning to an original mode later is performed to complicate the operation. As a result, there is a concern that the entire operation efficiency of the processing using the screen may deteriorate.

Even when a technique that changes the sharing setting depending on the location or state of the operator is used, a similar input is repeated when the same operation is repeatedly performed, and as a result, it is difficult to enhance the operation efficiency. In addition, even when the technique that operates the image object by recognizing the gesture of the operator is used, the same gesture is repeated many times in order to repeatedly input the same operation, and as a result, it is difficult to enhance the operation efficiency.

Hereinafter, embodiments will be described with reference to the accompanying drawings. Further, the embodiments do not limit a disclosed technique. In addition, respective embodiments may be appropriately combined with each other within a range that is not inconsistent in the processing contents.

First Embodiment

System Configuration

Figure 1:
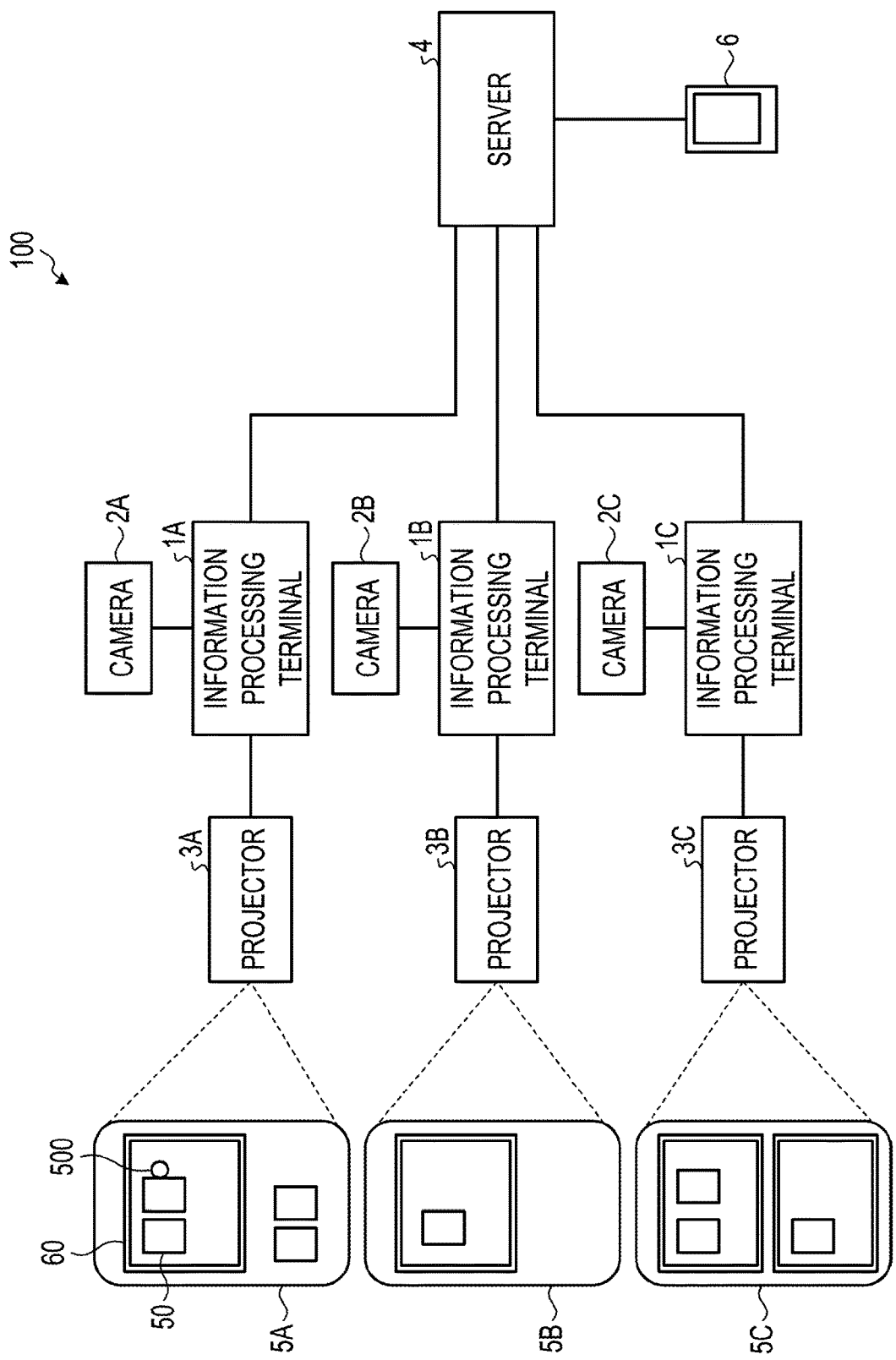
FIG. 1 is a system configuration diagram illustrating an example of an information processing system 100.

FIG. 1 is a system configuration diagram illustrating an example of an information processing system 100. The information processing system 100 illustrated in FIG. 1 displays work screens 5A to 5C at arbitrary places such as the walls and tables. In addition, the information processing system 100 is a system that receives an input of an operation on the displayed work screens 5A to 5C to perform a process in accordance with the input and feed back to the work screens 5A to 5C. In the information processing system 100, a work support application operates to manage digitized input information such as a digital sticky in which characters and images may be input by handwriting. Such a work support application may be called an imitation paper application.

The imitation paper application displays a card 50 in an imitation paper 60 disposed in the work screen 5 to manage the card 50 in units of the imitation paper 60. The card 50 includes another digital data such as, for example, the digital sticky, a hint card, and other materials and images. Further, the imitation paper application stores a correspondence of information of an operator corresponding to each imitation paper 60. In addition, the imitation paper application synchronizes the card 50 on the imitation paper 60 and a card 50 stored in a smart phone 6 of the operator corresponding to the imitation paper 60. Hereinafter, the imitation paper 60 corresponding to a certain operator may be referred to as the imitation paper 60 linked to the operator. Further, although the smart phone 6 is described herein as an example, other devices such as an information terminal which may be connected with a server 4 may also be used.

The information processing system 100 includes information processing terminals 1A to 1C, cameras 2A to 2C, projectors 3A to 3C, the server 4, and the smart phone 6. Each of the cameras 2A to 2C and each of the projectors 3A to 3C are connected to each of the information processing terminals 1A to 1C. The information processing terminal 1A displays the work screen 5A on the projector 3A. For example, the imitation paper 60 is displayed on the work screen 5A. In addition, the card 50 is displayed on the imitation paper 60. Further, the card 50 is displayed even in an area other than the imitation paper 60 of the work screen 5. In addition, the information processing terminal 1B displays the work screen 5B including the imitation paper 60 and the card 50 on the projector 3B. Further, the information processing terminal 1C displays the work screen 5C including the imitation paper 60 and the card 50 on the projector 3C.

The information processing terminals 1A to 1C display widgets 500 that readily apply a specific operation to the card 50 on the work screens 5A to 5C. Here, the widget 500 is a component of a graphical user interface of an operation program miniaturized so as to verify operation contents on the screen. The widget 500 executes an operation allocated thereto in groups unlike a menu bar or a context menu that executes an operation designated by one or more selection procedures by the operator. Details of the widget 500 will be described later.

The work screens 5A to 5C may be seamlessly used. That is, the work screens 5A to 5C may be considered as a single screen. Hereinafter, when the respective work screens 5A to 5C are not distinguished from each other, the work screens 5A to 5C are simply called a "work screen 5". On the work screen 5, a plurality of imitation papers 60 may be displayed or the card 50 may be displayed without displaying the imitation paper 60. The work screen 5 may be called a space user interface (UI).

All of the information processing terminals 1A to 1C have the same function. Therefore, hereinafter, when the information processing terminals 1A to 1C are not distinguished from each other, the information processing terminals 1A to 1C are simply called an "information processing terminal 1". Further, when it is illustrated that the cameras 2A to 2C are not distinguished from each other and are connected to the information processing terminal 1, the cameras 2A to 2C are called a "camera 2". Further, when it is illustrated that the projectors 3A to 3C are not distinguished from each other and are connected to the information processing terminal 1, the projectors 3A to 3C are called a "projector 3".

The operator writes on the card 50 displayed on the work screen 5 by using an electronic pen. Further, the operator inputs the operation for the card 50 by a touch input. The operation for the card 50 includes, for example, addition, change, duplication, deletion, and movement. Further, for example, when the operator adds a blank card 50, the operator inputs a predetermined gesture using the electronic pen.

For example, the operator moves the card 50 by dragging and dropping the card 50 with the electronic pen. Further, the operator touches the card 50 with the electronic pen or the like and causes the card 50 to move in a predetermined direction, so that the card 50 may be moved to another work screen 5 in a moving direction. For example, when the operator performs an operation of causing the card 50 displayed on the work screen 5A to move toward the work screen 5B with the electronic pen, the moving card 50 moves from the work screen 5A to the work screen 5B. That is, the card 50 displayed by the information processing terminal 1A is displayed on the work screen 5B by the information processing terminal 1B. Hereinafter, moving to another work screen 5 by causing the card 50 to move is referred to as an "inter-screen movement". Further, the operator causes the card 50 to move on the imitation paper 60 connected thereto to move the imitation paper 60 connected to another operator. Hereinafter, the operation is referred to as "inter-imitation paper movement". When the operator desires to leave the card 50 in the imitation paper 60 thereof and cause the card 50 to move to another imitation paper 60, the operator duplicates the card 50 and then, performs the inter-imitation paper movement of the duplicated card 50.

A plurality of operators may simultaneously perform the operation for the card 50 displayed on the work screen 5. The operation also includes an addition of the card 50. The plurality of operators may simultaneously input the operations for the card 50 regardless of whether the work screen 5 is the same or different. Further, the plurality of operators may simultaneously input the operations for the card 50 regardless of whether the imitation paper 60 is the same or different.

The server 4 includes a database that stores information on the card 50 generated by the information processing terminal 1. The server 4 has information on operators corresponding to the respective imitation papers 60 displayed on the work screen 5. In addition, when the smart phone 6 is connected, the server 4 specifies an owner of the connected smart phone 6. Then, the server 4 transmits the information of the card 50 stored in the smart phone 6 to the information processing terminal 1 which displays the imitation paper 60 corresponding to the operator which matches the specified owner. Further, the server 4 receives execution of the change, the addition, or the deletion of the card 50 on the imitation paper 60 from the information processing terminal 1. In addition, the server 4 synchronizes the imitation paper 60 and the smart phone 6 by performing the change of the card 50 stored in the smart phone 6 of the operator corresponding to the imitation paper 60, the addition of a new card 50, or the deletion of the card 50.

The information processing terminal 1 detects an operation input by touching the electronic pen or the touch panel from the image acquired by the camera 2. In addition, the information processing terminal 1 performs the operation for the card 50 serving as a target in accordance with the detected operation. For example, the information processing terminal 1 performs the operations including the addition, the deletion, the change, and the movement of the card 50. Specifically, in the information processing terminal 1, the imitation paper application that manages the digital sticky or a dedicated application that manages digital data other than the digital sticky such as the image operates. Further, in the information processing terminal 1, an application operates, which is different from an imitation paper application that manages a card 50 disposed at a place other than the imitation paper 60 on the work screen 5.

When the card 50 is added, the information processing terminal 1 notifies the server 4 of the addition of the card 50. Here, when the card 50 is added onto the imitation paper 60, the information processing terminal 1 also transmits the information of the imitation paper 60 to which the card 50 is added, to the server 4. Further, when the card 50 is deleted, the information processing terminal 1 notifies the server 4 of the deletion of the card 50. Here, when the card 50 on the imitation paper 60 is deleted, the information processing terminal 1 also transmits the information of the imitation paper 60 from which the card 50 is deleted, to the server 4. Further, when the card 50 is changed, the information processing terminal 1 transmits changed contents of the card 50 to the server 4.

Here, the information processing terminal 1 according to the embodiment makes it possible to execute the same process to a plurality of cards 50 by a simplified operation when the same operation is performed on the plurality of cards 50. Therefore, hereinafter, a configuration of the information processing terminal 1 will be described in detail.

Configuration of Information Processing Terminal 1

Figure 2:
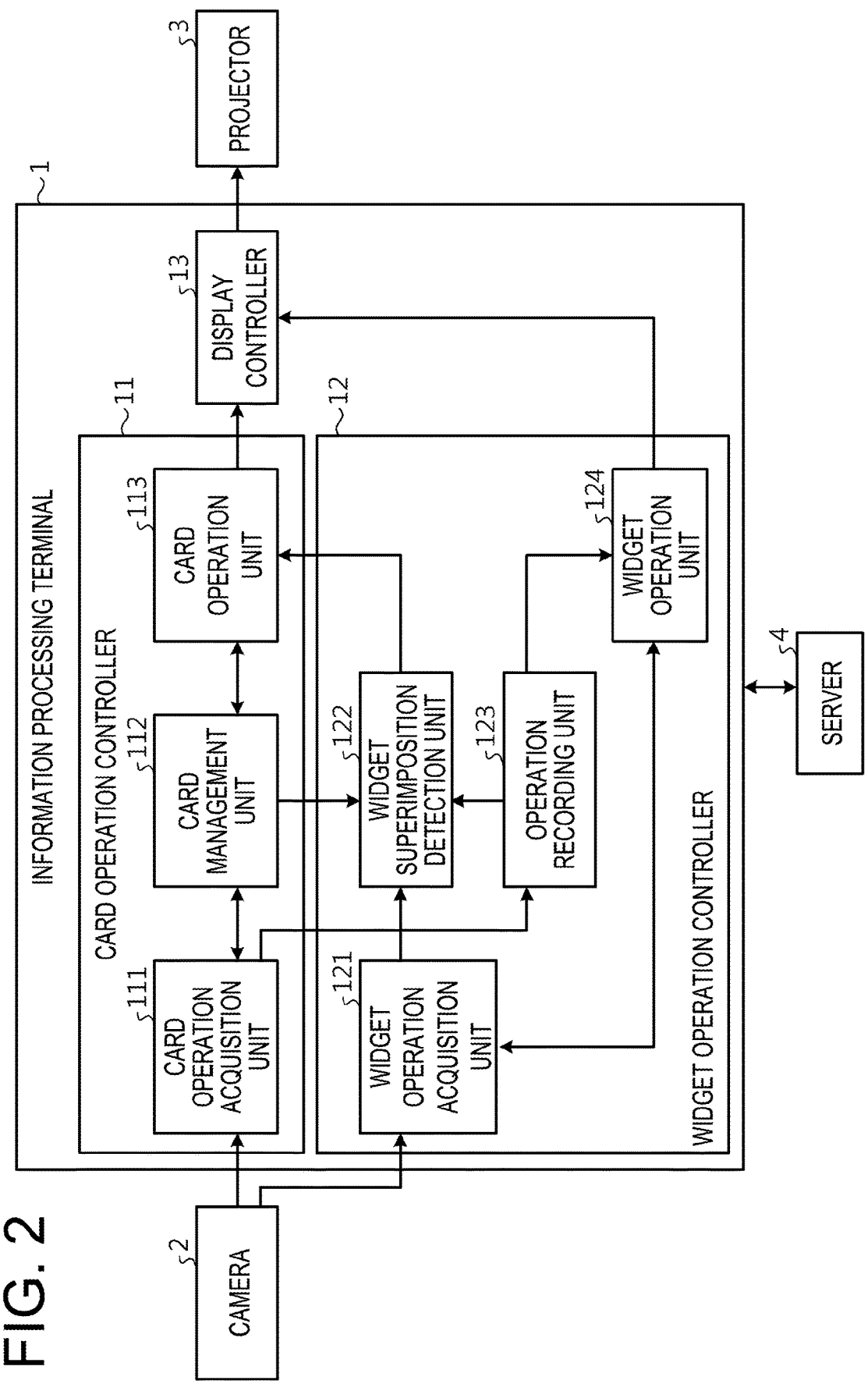
FIG. 2 is a block diagram of an information processing terminal 1.

FIG. 2 is a block diagram of an information processing terminal 1. As illustrated in FIG. 2, the information processing terminal 1 includes a card operation controller 11, a widget operation controller 12, and a display controller 13.

The card operation controller 11 performs execution of the operation and the management of the display for the card 50. The card operation controller 11 includes a card operation acquisition unit 111, a card management unit 112, and a card operation unit 113.

The card operation acquisition unit 111 receives an input of the image acquired by the camera 2. Then, the card operation acquisition unit 111 performs an image analysis, and acquires information including, for example, a position and a size of the card 50 for which the operation is performed and the operation for the card 50. In addition, the card operation acquisition unit 111 notifies the card management unit 112 and the operation recording unit 123 of the acquired information on the card 50 and information on the operation applied to the card 50.

For example, the card operation acquisition unit 111 stores in advance a gesture corresponding to the addition of the blank card 50, and when the operator performs the gesture using the electronic pen, the card operation acquisition unit 111 acquires an operation of the addition of the blank card 50.

Here, the operation by the operator is acquired by analyzing the image acquired from the camera 2, but an acquisition method of the operation is not limited to such a method. For example, in the case of the touch panel, the card operation acquisition unit 111 acquires the input operation by detecting the touch on the touch panel by the operator.

The card management unit 112 receives, from the card operation acquisition unit 111, a notification of information on the operated card 50 and information on the operation for the card 50. Then, the card management unit 112 performs a process by the operation designated for the card 50 for which the operation is performed for the information on the card 50 which is stored by the server 4. Furthermore, the card management unit 112 stores the location of the processed card 50 in association with identification information of the card 50. The process by the card management unit 112 according to a type of operation will be described below.

When the operation is the addition of the new card 50, the card management unit 112 allocates the identification information to the new card 50 and further, determines and stores a display location of the card 50. Further, the card management unit 112 stores information registered in the new card 50 in the server 4 in association with the identification information. The information registered in the card 50 is digital information such as characters and images. Further, when the new card 50 is blank, the card management unit 112 stores information indicating that the new card 50 is blank in the server 4 in association with the identification information. Then, the card management unit 112 notifies the card operation unit 113 of an instruction to display the new card 50 in which the designated information is registered at a determined location.

When the operation is the deletion of the card 50, the card management unit 112 deletes identification information of a card 50 to be deleted, which is stored by the card management unit 112, and location information corresponding to the identification information. In addition, the card management unit 112 deletes the information on the card 50 to be deleted from the server 4. Further, the card management unit 112 instructs the card operation unit 113 to delete the card 50.

When the operation is the change of the card 50, the card management unit 112 causes the server 4 to update the information of the card 50 in accordance with the change process performed on the card 50. In addition, the card management unit 112 instructs the card operation unit 113 to change the card 50.

When the operation is the movement of the card 50, the server 4 is caused to update the location information of the card 50 stored by the server 4 to a location after the movement of the card 50. In addition, the card management unit 112 updates the location information corresponding to the identification information of the card 50 owned by the card management unit 112 to new location information. Further, the card management unit 112 instructs the card operation unit 113 to move the card 50.

In particular, when the operation is the inter-screen movement of the card 50, and when the work screen 5 to which the card 50 is to move is a screen managed by its own device, the card management unit 112 causes the server 4 to store the changed display location of the card 50 and further updates the location information of the card 50 stored by the card management unit 112. In addition, the card management unit 112 instructs the card operation unit 113 to change the work screen 5 displaying the moving card 50. Thereafter, the card management unit 112 instructs the card operation unit 113 to move the card 50. Meanwhile, when the work screen 5 to which the card 50 is to move is a screen managed by another information processing terminal 1, the card management unit 112 requests that the information processing terminal 1 displaying the work screen 5 to which the card 50 is to move display the card 50. Further, the card operation unit 113 deletes the identification information of the card 50 owned thereby and corresponding location information. Thereafter, the card management unit 112 instructs the card operation unit 113 to delete the card 50 from the work screen 5. Meanwhile, the card management unit 112 of the information processing terminal 1, which receives the request for display of the card 50 by the inter-screen movement, determines a location at which the card 50 to be added is displayed and stores the determined location in association with the identification information. Further, the card management unit 112 stores the display location in the server 4 in association with the identification information of the added card 50. In addition, the card management unit 112 instructs the card operation unit 113 to display the card 50 at the determined location.

Even in the case of the inter-imitation paper movement of the card 50, the card management unit 112 performs the same process as in the case of the inter-screen movement by taking a movement destination as the imitation paper 60.

When the operation is the duplication of the card 50, the card management unit 112 adds the card 50 which is similar to the card 50 of a duplication source. That is, the card management unit 112 newly issues the identification information, determines the display location, and causes the server 4 to store the location information and contents of the new card 50 in association with the identification information. Furthermore, the card management unit 112 associates and stores the identification information and the location information of the new card 50. Thereafter, the card management unit 112 instructs the card operation unit 113 to display the new card 50 at the determined location.

The card operation unit 113 receives, from the card management unit 112, information on the card 50 for which the operation is performed and information on the operation performed for the card 50. In addition, the card operation unit 113 determines an image process for the card 50 when the designated operation is performed for the card 50. Specifically, in the case of the operation of the digital sticky on the imitation paper 60, the card operation unit 113 performs the operation by operating the imitation paper application.

Meanwhile, in the case of the operation of the digital sticky at a place other than the imitation paper 60, the card operation unit 113 performs the operation of the digital sticky by operating a card management program through which the card operation unit 113 directly manages the card 50. Further, when an operation for an object other than the digital sticky such as the addition of the image is performed, the card operation unit 113 operates a dedicated application to perform the operation for a designated object. Then, the card operation unit 113 instructs the display controller 13 to perform the display according to the determined image process.

For example, when the operation is the addition of the card 50, the card operation unit 113 receives, from the card management unit 112, an input of an instruction to display the card 50 including the location information, display information such as the size, a color, or a shape, and registration information of the card 50 to be added. Then, the card operation unit 113 instructs the display controller 13 to display the card 50 at the designated location on the work screen 5. Further, when the operation is the deletion of the card 50, the card operation unit 113 instructs the display controller 13 to delete the designated card 50 from the work screen 5. Further, when the operation is the change of the card 50, it is determined whether to add a difference to the current card 50 or delete the contents of the current card 50 and display new information. Then, the card operation unit 113 instructs the display controller 13 to display the card 50 in accordance with the determined contents.

When the operation is the movement of the card 50, the card operation unit 113 determines to display the card 50 while moving the card 50 from a current location toward the location after the movement. Then, the card operation unit 113 instructs the display controller 13 to display the determined operation of the card 50 on the work screen 5.

In particular, when the operation is the inter-screen movement of the card 50, the card operation unit 113 instructs the display controller 13 to change the work screen 5 to be displayed when the card operation unit 113 manages the work screen 5 to which the card 50 is to move. Contrary to this, when the work screen 5 to which the card 50 is to move is under management by another information processing terminal 1, the card operation unit 113 requests that the information processing terminal 1 displaying the work screen 5 to which the card 50 is to move display the card 50. Further, the card operation unit 113 instructs the display controller 13 to delete the card 50 from the work screen 5 displayed by the card operation unit 113. In addition, even in the case of the inter-imitation paper movement of the card 50, the card operation unit 113 performs the same process as the inter-screen movement by taking the movement destination as the imitation paper 60.

When the operation is the duplication of the card 50, the card operation unit 113 instructs the display controller 13 to perform a new display of the card 50 which is the same as the card 50 of the duplication source.

The card operation unit 113 receives, from a widget superimposition detection unit 122, a notification of information on the card 50 on which the widget 500 is superimposed and information on an operation allocated to the widget 500. In addition, the card operation unit 113 determines the image process for the card 50 when the operation allocated to the widget 500 is performed for the card 50. Then, the card operation unit 113 instructs the display controller 13 to display the card 50 in accordance with the determined contents.

The widget operation controller 12 includes a widget operation acquisition unit 121, a widget superimposition detection unit 122, an operation recording unit 123, and a widget operation unit 124.

The operation recording unit 123 acquires, from the card operation acquisition unit 111, location information of the card 50 for which the operation is performed and information on the operation performed for the card 50. Next, the operation recording unit 123 newly generates an identification number of the widget 500. Then, the operation recording unit 123 stores the information on the operation performed for the card 50 in association with the generated identification number. Thereafter, the operation recording unit 123 notifies the widget operation unit 124 of the generated identification information, the location information of the card 50 for which the operation is performed, and the information on the operation performed for the card 50.

The widget operation acquisition unit 121 acquires the location information of each widget 500 from the widget operation unit 124. Thereafter, the widget operation acquisition unit 121 receives the input of the image acquired by the camera 2. Then, the card operation acquisition unit 111 performs the image analysis to detect the operation for the widget 500. Here, the operation for the widget 500 is, for example, a drag-and-drop operation performed to move the widget 500 to another place.

Then, the widget operation acquisition unit 121 notifies the widget superimposition detection unit 122 and the widget operation unit 125 of the information on the operation performed for the widget 500. Here, the information on the operation performed for the widget 500 includes a trajectory from a start location to a stop location when the widget 500 moves.

Here, the widget operation acquisition unit 121 acquires the operation by the operator by analyzing the image acquired from the camera 2, but the acquisition method of the operation is not limited to such a method. For example, in the case of the touch panel, the widget operation acquisition unit 121 acquires the input operation by detecting the touch on the touch panel by the operator.

The widget superimposition detection unit 122 acquires, from the widget operation acquisition unit 121, information on the operation of the widget 500 for which the operation is performed. Further, the widget superimposition detection unit 122 acquires the information on the position of each card 50 from the card management unit 112.

Next, the widget superimposition detection unit 122 determines whether the operated widget 500 is superimposed on any one of the cards 50 by using the trajectory of movement of the operated widget 500. Here, in this embodiment, a state in which the widget 500 is superimposed on the card 50 represents a state in which the widget 500 is dropped inside the card 50. However, it may be determined for what state the widget 500 is superimposed on the card 50 in accordance with an operation state of the information processing system 100. For example, the widget superimposition detection unit 122 may determine that the widget 500 is superimposed on the card 50 when a portion of the widget 500 stops while being superimposed on the card 50 or when the widget 500 passes through the card 50.

When the widget superimposition detection unit 122 determines that the operated widget 500 is superimposed on any one card 50, the widget superimposition detection unit 122 acquires the information on the operation allocated to the widget 500 from the operation recording unit 123. In addition, the widget superimposition detection unit 122 notifies the card operation unit 113 of the information of the operation allocated to the operated widget 500 and the information of the card 50 on which the widget 500 is superimposed.

The widget operation unit 124 acquires, from the operation recording unit 123, the notification of identification information of a new widget 500, location information of the card 50 for which the operation is performed, and information on the operation performed for the card 50. Next, the widget operation unit 124 determines to add the new widget 500 having the notified identification information. In addition, the widget operation unit 124 generates the widget 500 associated with the notified card 50.

For example, the widget operation unit 124 has in advance information on a display location of the widget 500 on the card 50, the size of the widget 500, and information on the color or shape of the widget 500 corresponding to the operation. In addition, the widget operation unit 124 determines a display location of the widget 500 having a predetermined size depending on the location of the notified card 50. Further, the widget operation unit 124 acquires the color or shape of the widget 500 corresponding to the notified operation. In addition, the widget operation unit 124 instructs the display controller 13 to display the widget 500 having the acquired color or shape at the determined location on the work screen 5. In addition, the widget operation unit 124 notifies the widget operation acquisition unit 121 of the display location of the widget 500.

The widget operation unit 124 receives the notification of the information on the operation performed for the widget 500 from the widget operation acquisition unit 121. In addition, the widget operation unit 124 determines the image process for the widget 500 when the notified operation is performed for the widget 500. For example, the widget operation unit 124 determines to display the widget 500 while moving the widget 500 from the current location toward the location after the movement. Then, the widget operation unit 124 instructs the display controller 13 to display the widget 500 in accordance with the determined contents.

The widget operation unit 124 determines to erase the widget 500 from the work screen 5 when the widget 500 is dropped. Then, the widget operation unit 124 instructs the display controller 13 to erase the widget 500. Here, in the embodiment, the widget operation unit 124 erases the widget 500 from the work screen 5 at the timing of dropping the dragged widget 500, but the processing of the widget 500 after the movement is not limited thereto. For example, the widget operation unit 124 may erase the widget 500 after a predetermined time has elapsed after dropping the widget 500. Besides, the widget operation unit 124 may return the dropped widget 500 to an original location before dragging. In such a case, the widget operation unit 124 may erase the widget 500 which is returned to the original location after a predetermined time has elapsed and leave the widget 500 until the erase instruction is input as it is.

When the widget operation unit 124 does not receive the input of the information of the operation of the widget 500 from the widget operation acquisition unit 121 within a predetermined time after the display of the widget 500, the widget operation unit 124 erases the widget 500 from the work screen 5.

The display controller 13 receives a display instruction of the card 50 from the card operation unit 113. Then, the display controller 13 causes the projector 3 to display the card 50 in accordance with the instruction from the card operation unit 113. Further, the display controller 13 receives the display instruction of the widget 500 from the widget operation unit 124. Then, the display controller 13 causes the projector 3 to display the widget 50 in accordance with the instruction from the card operation unit 124.

Figure 3:
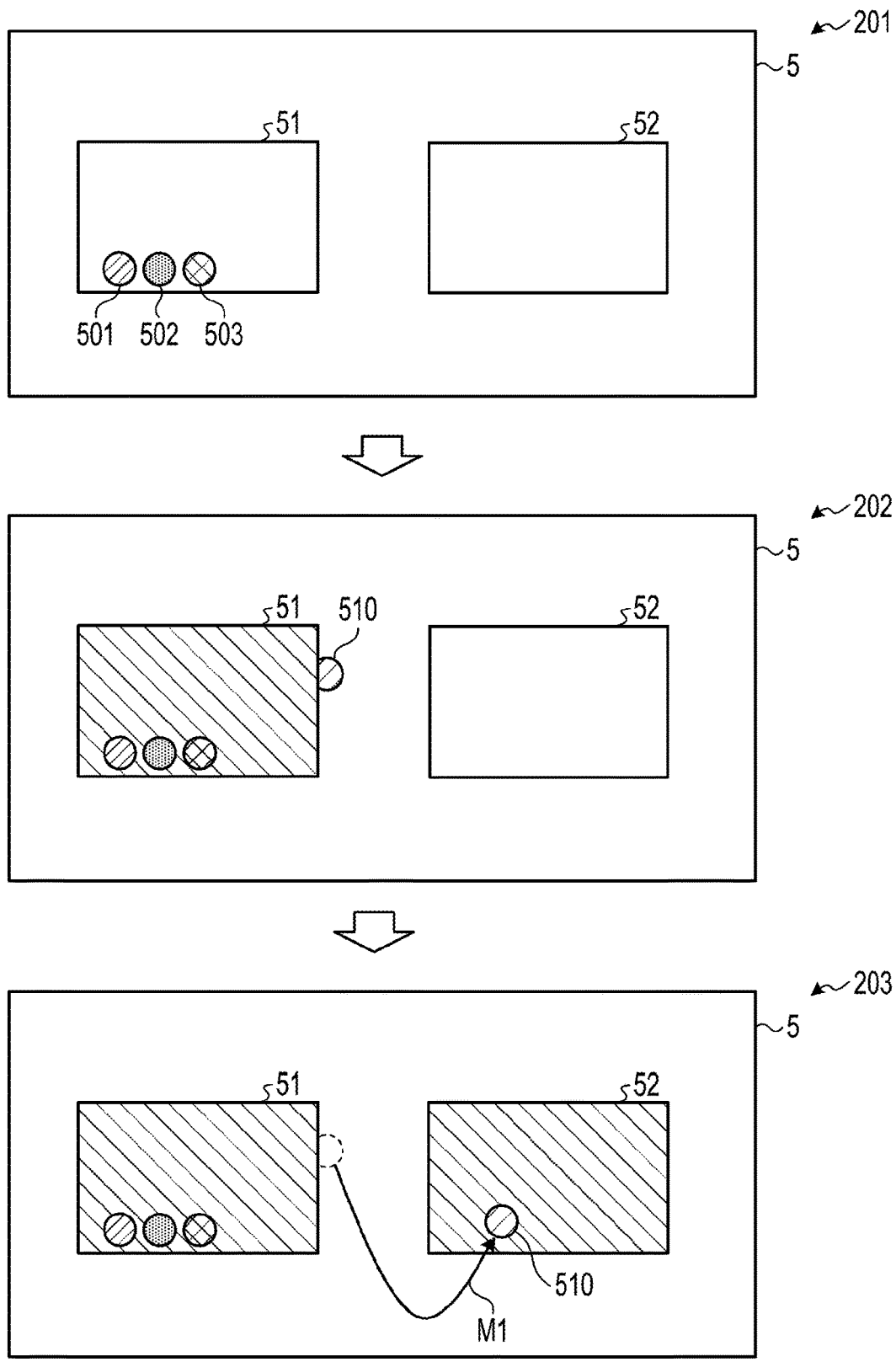
FIG. 3 is a diagram illustrating a transition of a screen when a widget 500 is used by an information processing terminal 1 according to a first embodiment.

Next, with reference to FIG. 3, descriptions will be made on the transition of the screen when the widget 500 is used by the information processing terminal 1 according to the embodiment. FIG. 3 is a diagram illustrating the transition of a screen when a widget 500 is used by an information processing terminal 1 according to a first embodiment. Here, descriptions will be made on a case where cards 51 and 52 are present as examples of the card 50.

A state 201 in FIG. 3 represents a state of the work screen 5 before the operation for the card 51 is performed. The cards 51 and 52 are not colored in this state. In addition, color change buttons 501 to 503 are arranged on the card 51. For example, the color change buttons 501 to 503 correspond to colors of blue, red, and yellow, respectively. In addition, when the operator presses any one of the color change buttons 501 to 503 with the electronic pen, the card 51 is changed to a color corresponding to the selected button among the color change buttons 501 to 503.

Here, it is assumed that the operator presses the color changing button 501 corresponding to the blue color with the electronic pen. The state 202 represents a state of the work screen 5 after the operation for the card 51 is performed. That is, when the operator presses the color change button 501 with the electronic pen, the card operation acquisition unit 111 acquires an operation of pressing the arranged color change button 501 as the operation for the card 51. Then, the card management unit 112 stores that the color of the card 51 is blue in association with the identification information of the card 51. The card operation unit 113 changes the card 51 to the blue color as represented in the state 202.

In this case, the operation recording unit 123 generates an identification number of a new widget 500. The operation recording unit 123 stores, as the operation information, an operation of changing the color to the blue color in association with the newly generated identification number. Then, the widget operation unit 124 causes the widget 510 corresponding to the newly generated identification number to be displayed in the vicinity of the card 51.

Next, the operator performs the same operation for the card 52 as the operation performed for the card 51 using the widget 510. The state 203 represents a state of the work screen 5 when performing the same operation as the card 51 for the card 52 using the widget 510. The operator drags the widget 510 and drops the dragged widget 510 in the card 52 using the electronic pen.

In this case, the widget operation acquisition unit 121 acquires an operation of moving along a trajectory M1 as the operation for the widget 510. The widget operation unit 124 receives the notification from the widget operation acquisition unit 121 and moves the widget 510 along the trajectory M1.

The widget superimposition detection unit 122 acquires the information on the operation for the widget 510 along the trajectory M1 from the widget operation acquisition unit 121 and further, acquires the location information of the card 52 from the card management unit 112 to detect that the widget 510 is superimposed on the card 52. In addition, the widget superimposition detection unit 122 acquires the operation information corresponding to the widget 510 from the operation recording unit 123. The card operation unit 113 receives the notification from the widget superimposition detection unit 122 to execute the operation corresponding to the widget 510 for the card 52. That is, the card operation unit 113 changes the card 52 to the blue color.

As described above, when the operator performs an operation to change the card 51 to the blue color, the widget 510 corresponding to the operation is displayed in the vicinity of the card 51. Then, as the operator drags and drops the widget 510 into the card 52, the card 52 is changed to the blue color.

Generation Process of Widget 500

Figure 4:
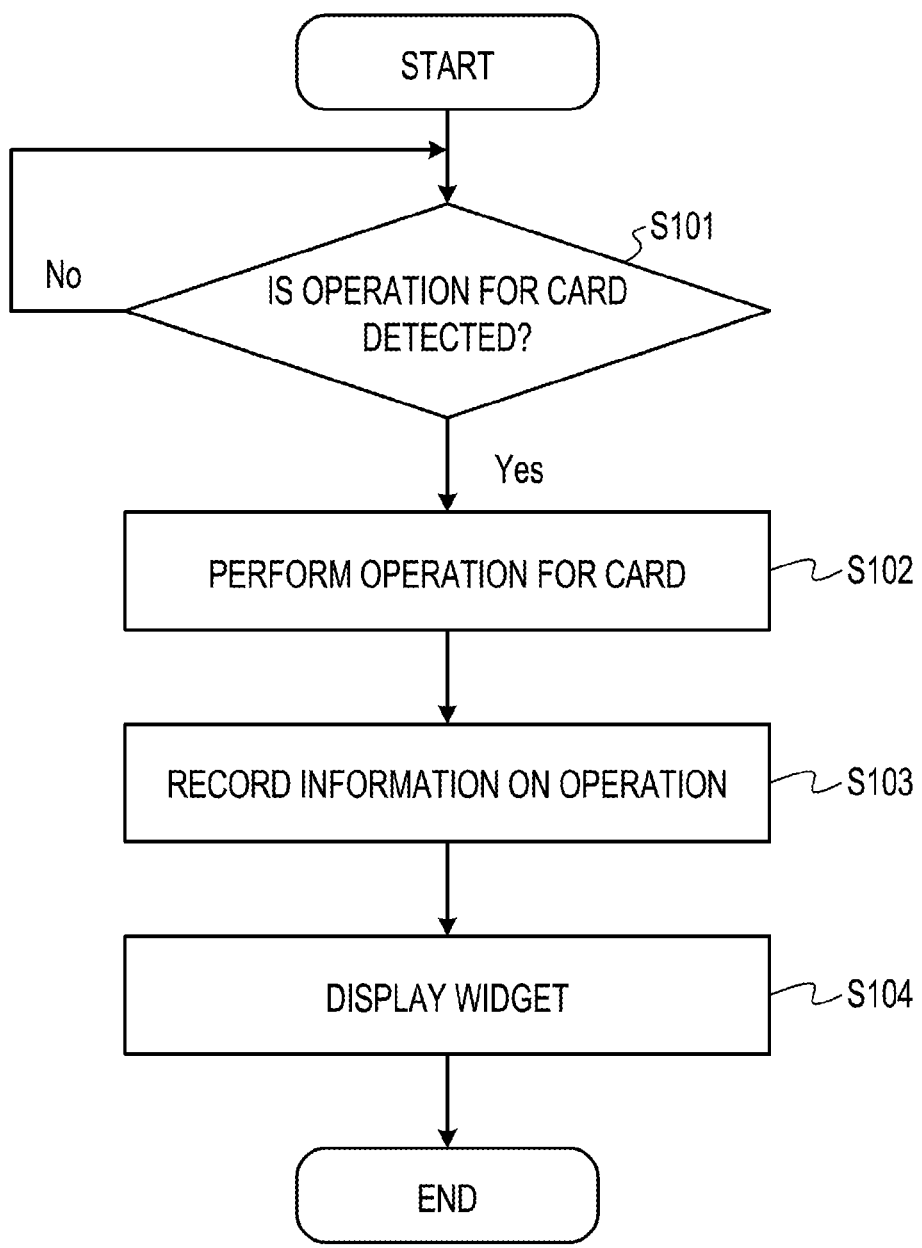
FIG. 4 is a flowchart illustrating an order of a generation process of the widget 500 by the information processing terminal 1.

Next, with reference to FIG. 4, descriptions will be made on a flow of a generation process of the widget 500. FIG. 4 is a flowchart illustrating an order of a generation process of the widget 500 by the information processing terminal 1.

The card operation acquisition unit 111 analyzes the image acquired from the camera 2 and determines whether the operation of the card 50 is detected (step S101). When it is determined that the operation of the card 50 is not detected ("No" in step S101), the card operation acquisition unit 111 waits until the operation of the card 50 is performed.

Contrary to this, when it is determined that the operation of the card 50 is detected ("Yes" in step S101), the card operation acquisition unit 111 outputs the information on the operation for the card 50 to the card management unit 112 and the operation recording unit 123. The card management unit 112 registers information after the operation is performed for the card 50 in association with the identification information of the operated card 50. Then, the card operation unit 113 causes the operation screen 5 to display the state of the operated card 50 and operates the card 50 (step S102).

The operation recording unit 123 newly generates the identification information of the widget 500 and records the information on the operation for the card 50 in association with the generated identification information (step S103).

Next, the operation recording unit 123 notifies the widget operation unit 124 of the information on the operation for the card 50. The widget operation unit 124 causes the widget 500 corresponding to the operation to be displayed in the vicinity of the card 50 on the work screen 5 (step S104).

Operation Application Process Using Widget 500

Figure 5:
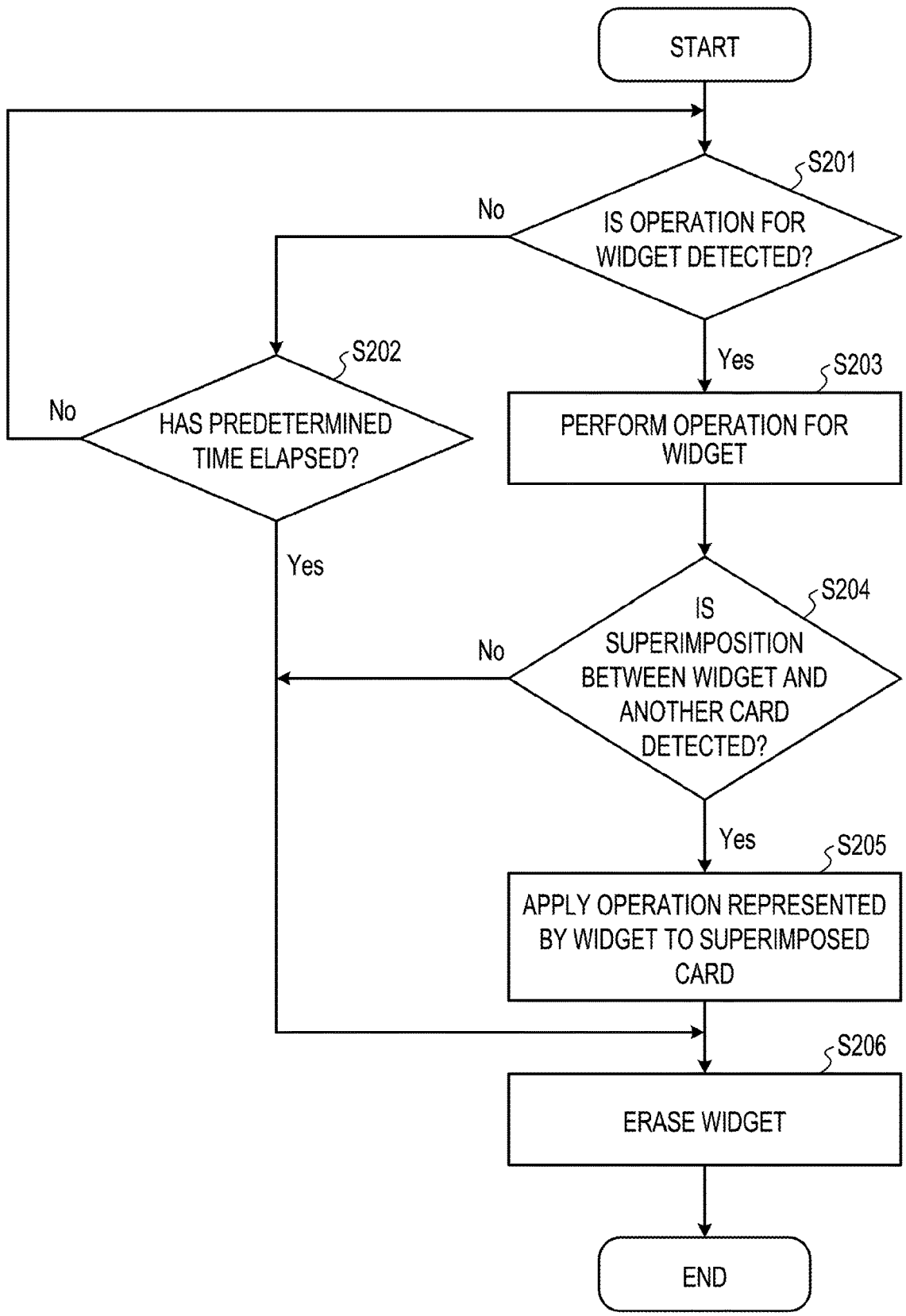
FIG. 5 is a flowchart illustrating an order of applying an operation using the widget 500 according to the first embodiment.

Next, with reference to FIG. 5, descriptions will be made on a flow of a process of applying the operation for the card 50 using the widget 500 by the information processing terminal 1 according to the embodiment. FIG. 5 is a flowchart illustrating an order of applying an operation using the widget 500 according to the first embodiment.

The widget operation acquisition unit 121 analyzes the image acquired from the camera 2 and determines whether the operation of the widget 500 is detected (step S201). When it is determined that the operation of the widget 500 is not detected ("No" in step S201), the widget operation unit 124 determines whether a predetermined time has elapsed (step S202). When it is determined that the predetermined time has not elapsed ("No" in step S202), the process of the operation using the widget 500 returns to step S201.

Contrary to this, when it is determined that the predetermined time has elapsed ("Yes" in step S202), the widget operation unit 124 proceeds to step S206.

Meanwhile, when it is determined that the operation of the widget 500 is detected ("Yes" in step S201), the widget operation unit 124 operates the widget 500 by displaying the state in which the operation is performed for the widget 500 in accordance with the operation detected by the widget operation acquisition unit 121 on the work screen 5 (step S203).

Next, the widget superimposition detection unit 122 determines whether a superimposition between the widget 500 and another card 50 is detected using the information on the operation for the widget 500 and the information on another card 50 (step S204).

When it is determined that a superimposition between the widget 500 and another card 50 is not detected ("No" in step S204), the widget superimposition detection unit 122 proceeds to step S206.

Contrary to this, when it is determined that a superimposition of the widget 500 and another card 50 is detected ("Yes" in step S204), the widget superimposition detection unit 122 applies the operation represented by the widget 500 to the card 50 on which the widget 500 is superimposed (step S205).

Thereafter, the widget operation unit 124 erases the widget 500 from the work screen 5 (step S206).

Here, in the above description, the functions of generating and operating the widget 500 are mounted in the information processing terminal 1, but mounting locations are not limited thereto and may be mounted, for example, on the server 4.

One Aspect of Effect

As described above, the information processing terminal 1 according to the embodiment displays the widget 500 which represents the operation performed for the card 50 in the vicinity of the card 50. Then, when the widget 500 is superimposed on another card 50, the information processing terminal 1 applies the operation represented by the widget 500 to the superimposed card 50. Unlike the menu bar and the context menu, the widget 500 may apply a specific operation to the target card 50 by drag-and-drop. Further, an operation target is not selected and edited in advance, but the operation target is selected later to reduce the number of operation steps. That is, the same operation may be applied to other cards 50 by a simple operation for the widget 500. Further, a repetitive operation may be started naturally from a normal operation by using the widget 500. Therefore, it is possible to enhance the operation efficiency using the work screen 5.

When a card 50 to which the same operation is applied is selected by changing the mode of work to the selection mode and the operation is collectively performed for the selected card 50 as in the related art, a case may be considered where operations of many persons may not be accepted in a state of the selection mode due to the characteristics of the mode. In this case, in order for a plurality of operators to perform the operation simultaneously using the work screen 5, an operation mode is managed for each operator. Further, even in a case where the operation mode is switched to a mode of performing a specific operation such as a color change and a plurality of cards 50 is designated to apply a specific operation, when one work screen 5 is operated by plural persons, the operation mode for each user is managed.

However, in the case of the electronic pen or the touch input, since it is difficult to identify the operator who made the input, it is difficult to manage such a mode for each operator and the mode change affects the operations of other users. Contrary to this, in the information processing terminal 1 according to the embodiment, each operator may apply the same operation to another card 50 by dragging and dropping the widget 500 onto the target card 50. Therefore, even when one work screen 5 is operated by a plurality of persons, it is possible to reduce the influence of the operation of each operator on the other operator and to enhance the operation efficiency as compared with the related art.

Second Embodiment

Next, a second embodiment will be described. The information processing terminal 1 according to the embodiment has a function of canceling an operation applied to the card 50 when the widget 500 once superimposed on the specific card 50 is temporarily taken out of the card 50 and superimposed on the card 50 again. In the following description, the description of the operation of each unit explained in the first embodiment will be omitted.

Figure 6:
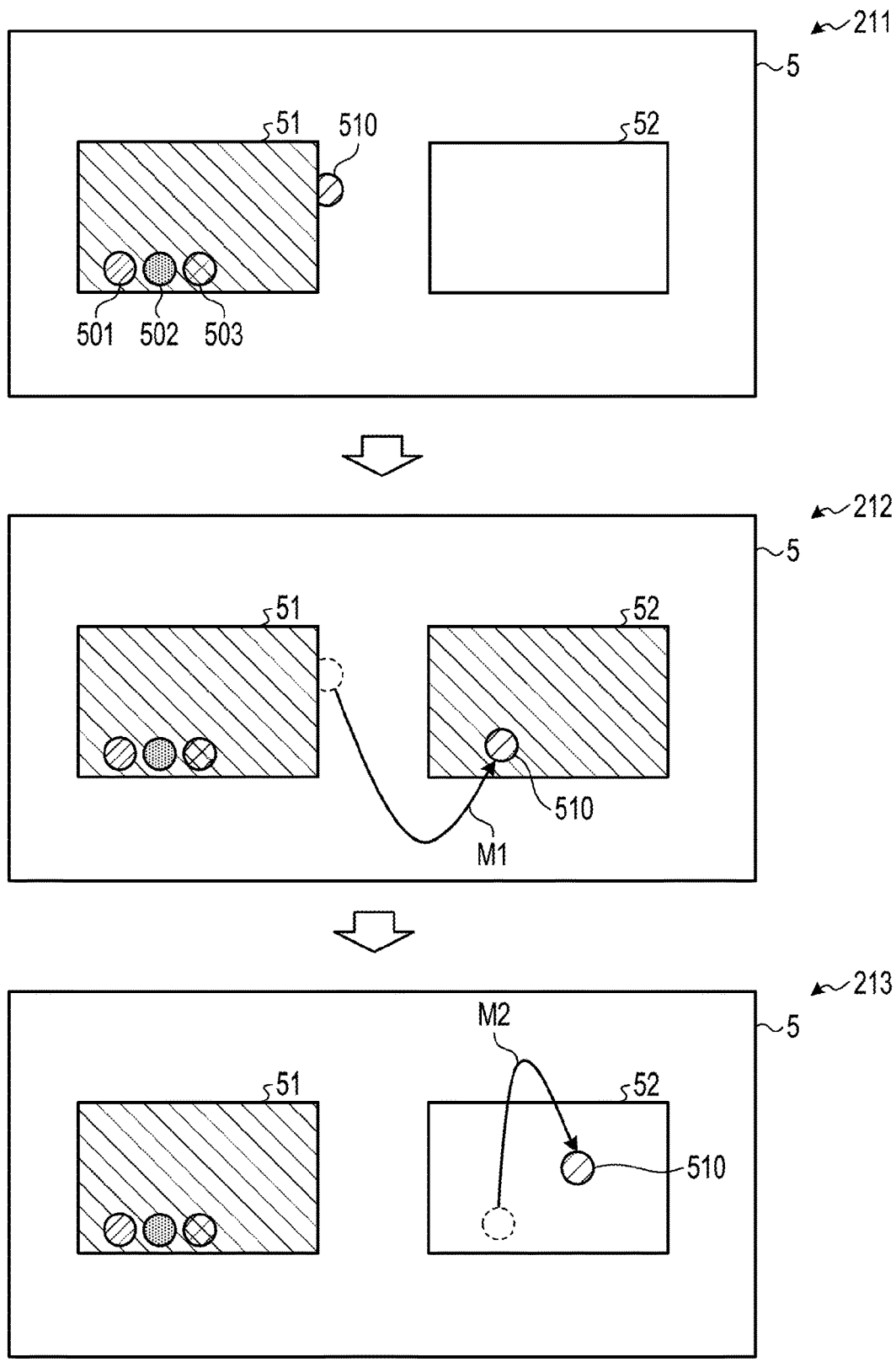
FIG. 6 is a diagram illustrating a transition of a screen when a widget 500 is used by an information processing terminal 1 according to a second embodiment.

FIG. 6 is a diagram illustrating the transition of a screen when a widget 500 is used by an information processing terminal 1 according to a second embodiment. Here, descriptions will be made on a case where the cards 51 and 52 exist as the card 50 and the widget 510 is generated as the widget 500.

A state 211 represents a state of the work screen 5 after the operation for the card 51 is completed. A state 212 represents a state of the work screen 5 when applying the same operation as the card 51 to the card 52 using the widget 510. A state 213 represents a state of the work screen 5 at the time of canceling the operation once applied by the widget 510.

The widget operation unit 124 changes the card 51 to the blue color as represented in the state 211 by pressing the color change button 501 on the card 51 with the electronic pen and further, displays the widget 510 in the vicinity of the card 51 on the work screen 5. Next, in a case where the widget 510 arranged in the vicinity of the card 51 is dragged and dropped so as to be superimposed on the card 52 as in the trajectory M1 of the state 212, the widget operation unit 124 moves the widget 510 on the work screen 5 in accordance with the operation.

Thereafter, the widget operation unit 124 continues to display the widget 510 at the dropped location on the card 52 until a predetermined time has elapsed after the drop. After the drop, when a predetermined time has elapsed without performing any other operation for the widget 510, the widget operation unit 124 erases the widget 510 from the work screen 5. Contrary to this, when the widget 500 is taken out of the card 52 and superimposed on the card 52 again after the drop as in a trajectory M2 of the state 213, the widget operation unit 124 moves the widget 510 on the work screen 5 in accordance with the operation.

In the case of the state 212, the widget superimposition detection unit 122 detects the superimposition of the widget 510 and the card 52 and instructs the card operation unit 113 to apply the operation allocated to the widget 510 to the card 52. Further, in the case of the state 213, the widget superimposition detection unit 122 detects elimination of the superimposition of the widget 510 superimposed on the card 52 with the card 52 and the subsequent superimposition of the widget 510 and the card 52 again. Then, the widget superimposition detection unit 122 instructs the card operation unit 113 to undo the application of the operation allocated to the widget 510 for the card 52.

In the case of the state 212, the card operation unit 113 receives the instruction from the widget superimposition detection unit 122, applies the operation allocated to the widget 510 to the superimposed card 50, and changes the card 52 to the blue color as represented in the state 212. Further, in the case of the state 213, the card operation unit 113 receives the instruction from the widget superimposition detection unit 122 to determine to undo the application of the operation allocated to the widget 510 for the card 52. Then, the card operation unit 113 returns the color of the card 52 to the color before changing to the blue color. Further, the card operation unit 113 notifies the card management unit 112 of the information for the operation for the card 52.

As described above, the information processing terminal 1 according to the embodiment cancels the operation represented by the widget 500 applied to the card 50 when the widget 500 superimposed on the specific card 50 is temporarily taken out of the card 50 and superimposed on the card 50 again. Therefore, the operation applied to the card 50 by using the widget 500 may be cancelled by a simple operation for the widget 500. Therefore, it is possible to enhance the operation efficiency using the work screen 5.

Third Embodiment

Next, a third embodiment will be described. The information processing terminal 1 according to the embodiment displays a plurality of widgets 500 which represents a plurality of operations successively performed for the card 50, respectively, in the vicinity of the card 50. In the following description, the description of the operation of each unit explained in each embodiment will be omitted.

Figure 7:
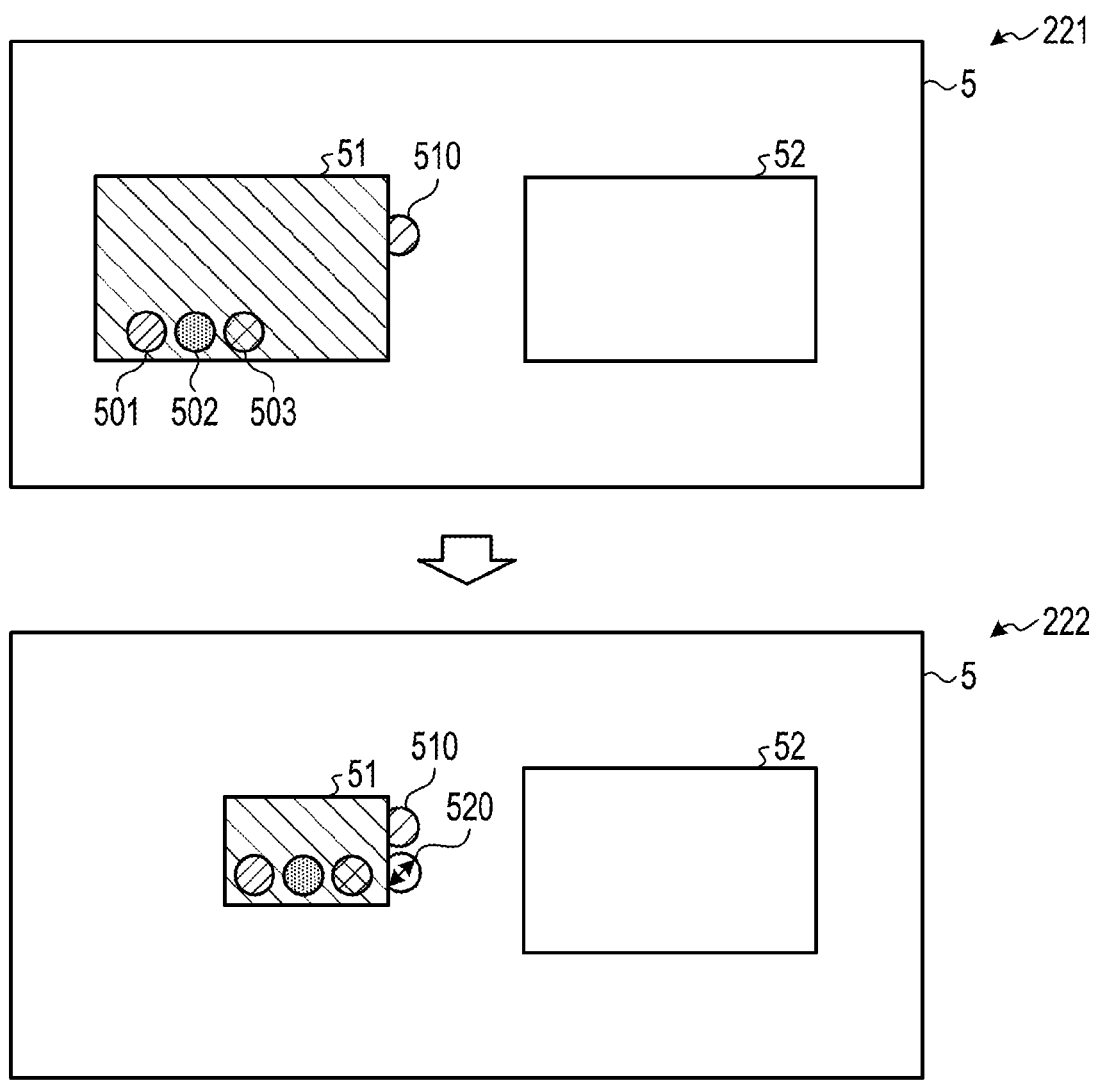
FIG. 7 is a diagram illustrating a transition of a screen when a widget 500 is generated by an information processing terminal 1 according to a third embodiment.

FIG. 7 is a diagram illustrating the transition of a screen when a widget 500 is generated by an information processing terminal 1 according to a third embodiment. Here, descriptions will be made on a case where the cards 51 and 52 exist as the card 50 and the widgets 510 and 520 are generated as the widget 500.

A state 221 represents a state of the work screen 5 after a first operation for the card 51 is completed. A state 222 represents a state of the work screen 5 after a second operation for the card 51 is completed. Here, the widget operation unit 124 has in advance a display location of the widget 510 corresponding to the first operation on the card 51 and a display location of the widget 520 corresponding to the second operation on the card 51.

The widget operation unit 124 receives an input of an operation in which the color change button 501 on the card 51 is pressed with the electronic pen. Then, as represented in the state 221, the widget operation unit 124 changes the card 51 to the blue color as an operation corresponding to pressing of the color change button 501. Further, the widget operation unit 124 causes the widget 510 which represents the change to the blue color to be displayed in the vicinity of the card 51 on the work screen 5.

Next, the widget operation unit 124 receives an input of an operation of reducing the size of the card 51 from the widget operation acquisition unit 121. Then, as represented in the state 222, the widget operation unit 124 reduces the size of the card 51 on the work screen 5 depending on an operation amount. Further, the widget operation unit 124 causes the widget 520 which represents the reduction of the size to be displayed side by side in the widget 510 in the vicinity of the card 51 on the work screen 5.

Thereafter, when receiving the input of the operation of the drag and drop of the widget 510 or 520 from the widget operation acquisition unit 121, the widget operation unit 124 moves the widget 510 or 520 on the work screen 5 in accordance with the input operation.

Figure 8:
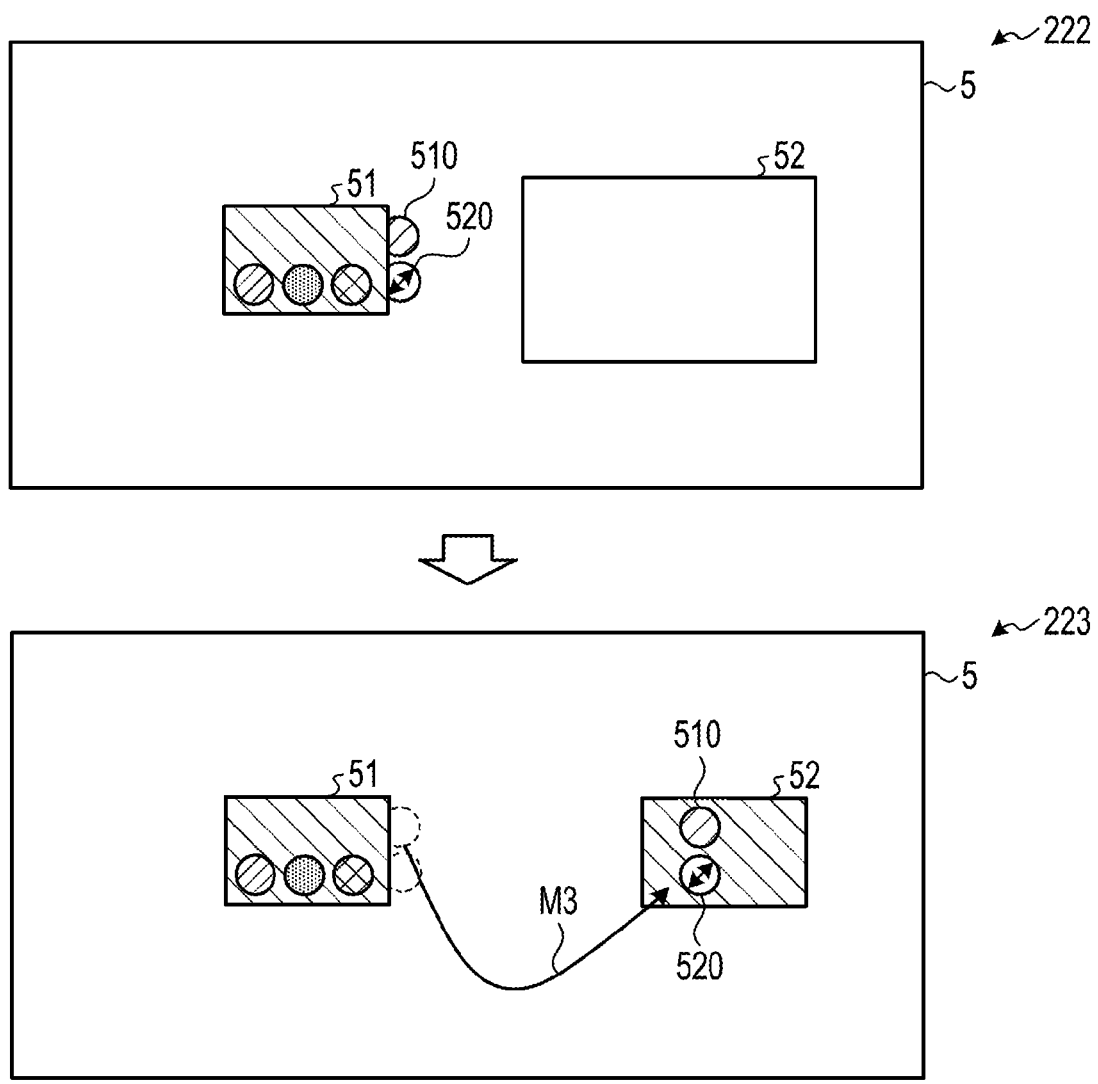
FIG. 8 is a diagram illustrating a transition of a work screen 5 when operations allocated to a plurality of widgets 500 are simultaneously applied.

When receiving an input of an operation of simultaneously dragging and dropping the widgets 510 and 520 from the widget operation acquisition unit 121, the widget operation unit 124 performs the following operation. The widget operation unit 124 moves the widgets 510 and 520 on the work screen 5 together as indicated by a trajectory M3 in FIG. 8 in accordance with the input operation. FIG. 8 is a diagram illustrating the transition of a work screen 5 when operations allocated to a plurality of widgets 500 are simultaneously applied. A state 223 represents a state of the work screen 5 at the time of simultaneously dragging and dropping two widgets 500. In this case, the widgets 510 and 520 are superimposed on the card 52 on the work screen 5.

When the widget 510 or 520 is dragged and dropped so as to be superimposed on the card 52, the widget superimposition detection unit 122 detects superimposition of the widget 510 or 520 and the card 52. Then, the widget superimposition detection unit 122 instructs the card operation unit 113 to apply the operation allocated to the superimposed widget 510 or 520 to the card 52.

In the case of the state 223 in FIG. 7, a superimposition of the widgets 510 and 520 and the card 52 is detected. Then, the widget superimposition detection unit 122 instructs the card operation unit 113 to apply the operation allocated to the superimposed widgets 510 and 520 to the card 52. In this case, the widget superimposition detection unit 122 also specifies the order of application of the operation represented by the widget 510 and the operation represented by the widget 520.

When receiving the instruction of the operation allocated to the widget 510 or 520 from the widget superimposition detection unit 122, the card operation unit 113 applies the operation allocated to the designated one of the widgets 510 and 520 to the superimposed card 50. When the widget 510 is superimposed on the card 52, the card operation unit 113 changes the card 52 to the blue color. Further, when the widget 520 is superimposed on the card 52, the card operation unit 113 reduces the size of the card 52. Thereafter, the card operation unit 113 notifies the card management unit 112 of the information on the operation allocated to any one of the widgets 510 and 520 applied to the card 52.

Meanwhile, when receiving the instruction of the operations allocated to the widgets 510 and 520, the card operation unit 113 applies the operation allocated to the widget 510 to the card 52 and then, applies the operation allocated to the widget 520 to the card 52. As a result, the card 52 is changed to the blue color and the size of the card 52 is also reduced. Thereafter, the card operation unit 113 notifies the card management unit 112 of the information on the operations allocated to the widgets 510 and 520 applied to the card 52.

As described above, the information processing terminal 1 according to the embodiment displays the widget 500 which represents each of processes successively performed for the card 50 in the vicinity of the card 50 for which the operation is performed. Then, when one of the plurality of widgets 500 is superimposed on another card 50, the information processing terminal 1 applies the operation represented by the one selected widget 500 to the superimposed card 50. Further, when some of the plurality of widgets 500 are superimposed on another card 50, the information processing terminal 1 applies the operations allocated to the some widgets 500 to the superimposed card 50 in an order in which the operations are performed. As a result, when a plurality of operations is performed for a specific card 50, one or more of the plurality of operations may be applied to another card 50 by a simple operation for the widget 500. Therefore, it is possible to enhance the operation efficiency using the work screen 5.

Fourth Embodiment

Next, a fourth embodiment will be described. The information processing terminal 1 according to the embodiment has a function of canceling an operation performed on a specific card 50 by using the widget 500 generated by the operation. In the following description, the description of the operation of each unit explained in each embodiment will be omitted.

Figure 9:
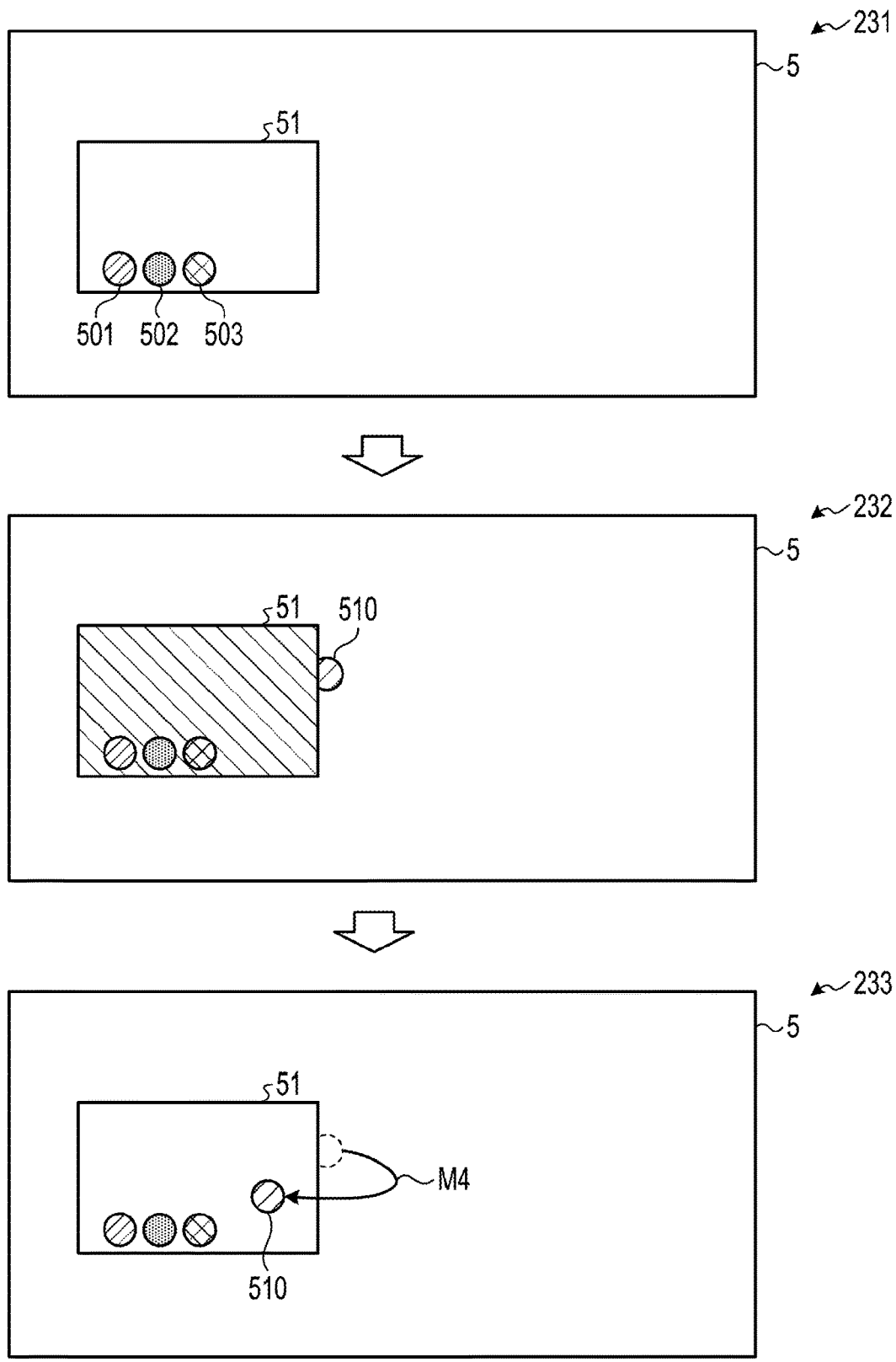
FIG. 9 is a diagram illustrating a transition of a screen when a widget 500 is used by an information processing terminal 1 according to a fourth embodiment.

FIG. 9 is a diagram illustrating the transition of a screen when a widget 500 is used by an information processing terminal 1 according to a fourth embodiment. Here, descriptions will be made on a case where the card 51 exists as the card 50 and the widget 510 is generated as the widget 500.

A state 231 represents a state of the work screen 5 before the operation for the card 51 is performed. A state 232 represents a state of the work screen 5 after the operation for the card 51 is performed. A state 233 represents a state of the work screen 5 at the time of canceling the operation once performed by the widget 510.

As represented in the state 231, in the state before the operation, the card 51 displayed on the work screen 5 is colorless. In this state, the operator presses the color change button 501 to change the color of the card 51 to the blue color with the electronic pen.

The widget operation unit 124 changes the card 51 to the blue color as represented in the state 232 by pressing the color change button 501 on the card 51 with the electronic pen and further, displays the widget 510 in the vicinity of the card 51 on the work screen 5. Next, in a case where the widget 510 arranged in the vicinity of the card 51 is dragged and dropped so as to be superimposed on the same card 51 as in a trajectory M4 of the state 233, the widget operation unit 124 moves the widget 510 on the work screen 5 in accordance with the operation.

In the case of the state 233, the widget superimposition detection unit 122 detects a superimposition of the widget 510 arranged in the vicinity of the card 51 with the same card 51. Then, the widget superimposition detection unit 122 instructs the card operation unit 113 to undo the application of the operation allocated to the widget 510 for the card 51.

In the case of the state 233, the card operation unit 113 receives the instruction from the widget superimposition detection unit 122 to determine to undo the application of the operation allocated to the widget 510 for the card 51. Then, the card operation unit 113 returns the color of the card 51 to the color before the change to the blue color. That is, the card operation unit 113 displays the colorless card 51 on the work screen 5. Further, the card operation unit 113 notifies the card management unit 112 of the cancellation of the operation for the card 52.

As described above, the information processing terminal 1 according to the embodiment cancels the operation performed for the card 50 when the widget 500 which represents the operation generated by performing the operation for the card 50 is superimposed on the same card 50. As a result, the operation performed for the card 50 may be cancelled by a simple operation for the widget 500. Therefore, it is possible to enhance the operation efficiency using the work screen 5.

Fifth Embodiment

Next, a fifth embodiment will be described. The information processing terminal 1 according to the embodiment has a function of successively applying an operation performed for a specific card 50 to a plurality of cards 50 by using the widget 500. In the following description, the description of the operation of each unit explained in each embodiment will be omitted.

Figure 10:
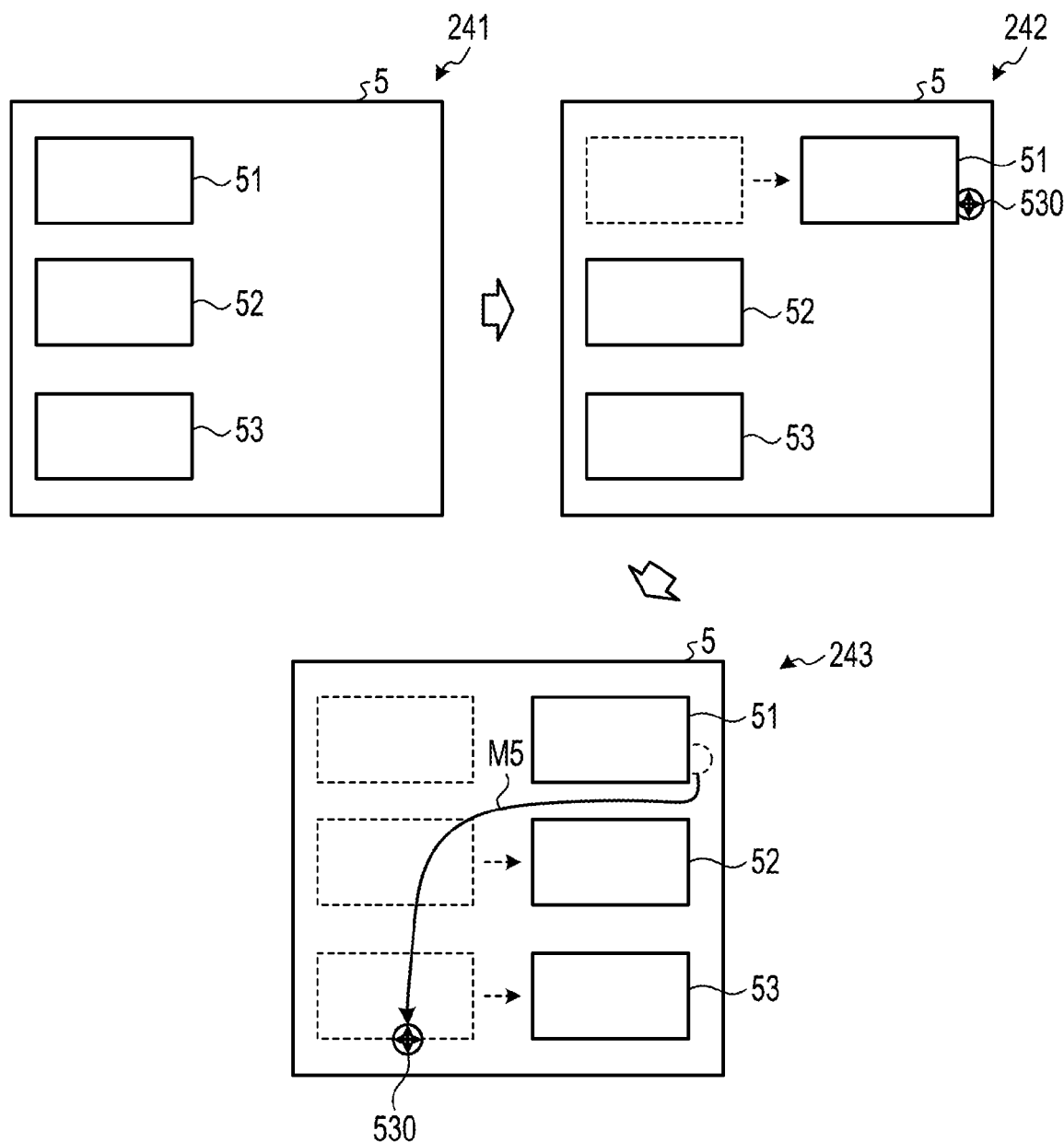
FIG. 10 is a diagram illustrating a transition of a screen during a relative operation by an information processing terminal 1 according to a fifth embodiment.

FIG. 10 is a diagram illustrating the transition of a screen during a relative operation by an information processing terminal 1 according to a fifth embodiment. Here, descriptions will be made on a case where the cards 51 to 53 exist as the card 50 and the widget 530 is generated as the widget 500.

A state 241 represents a state of the work screen 5 before the operation for the card 51 is performed. A state 242 represents a state of the work screen 5 after the operation for the card 51 is performed. A state 243 represents a state of the work screen 5 when successively applying the operation performed for the card 51 to the cards 52 and 53.

The operator operates the electronic pen so as to move the card 51 in the case of the state 241 to a location represented by the state 242.

Upon receipt of the information on the operation from the widget operation acquisition unit 121, the widget operation unit 124 moves the card 51 to the location represented by the state 242. Further, the widget operation unit 124 displays the widget 530 which represents the movement in the vicinity of the card 51 on the work screen 5.

Next, the widget operation unit 124 receives an input of the operation in which the widget 530 moves while being dragged and dropped and superimposed on the cards 52 and 53 as in a trajectory M5 of the state 243. In addition, the widget operation unit 124 moves the widget 530 on the work screen 5 in accordance with the operation.

In the case of the state 243, the widget superimposition detection unit 122 detects a superimposition of the widget 530 with the cards 52 and 53. In the embodiment, not only when the widget 530 is dropped in the card 52 or 53, but also when the state occurs in which the widget 530 is superimposed on the cards 52 and 53 during the movement, the widget superimposition detection unit 122 determines that the widget 530 is superimposed on the cards 52 and 53. Then, the widget superimposition detection unit 122 instructs the card operation unit 113 to apply the operation allocated to the widget 530 to the cards 52 and 53.

In the case of the state 212, the card operation unit 113 receives the instruction to apply the operation allocated to the widget 530 to the cards 52 and 53 from the widget superimposition detection unit 122. In addition, the card operation unit 113 applies the operation allocated to the widget 510 to the superimposed cards 52 and 53 so as to move the cards 52 and 53 in the same direction and in the same distance as the card 51 as represented in the state 243. As described above, in the embodiment, the card operation unit 113 operates the cards 52 and 53 so that a relative relationship between a state before operating the card 51 and a state after operating the card 51 is maintained in the cards 52 and 53 before the operation and the cards 52 and 53 after the operation. Such an operation may be hereinafter referred to as a "relative operation". Thereafter, the card operation unit 113 notifies the card management unit 112 of the information for the operations for the cards 52 and 53. It may be said that the relative operation is an operation of applying, to the card 52, a relative change between the card 51 before performing the first operation and the card 51 after performing the first operation.

Here, although the card operation unit 113 performs the relative operation when applying the widget 530 to the cards 52 and 53, other operations may be performed. That is, the card operation unit 113 may operate the cards 52 and 53 so that the cards 52 and 53 maintain a state 510 after the operation. Such an operation may be hereinafter referred to as an "absolute operation". The absolute operation may be referred to as an operation of changing the card 52 to a state after changing the card 51, which occurs by performing the first operation.

Figure 11:
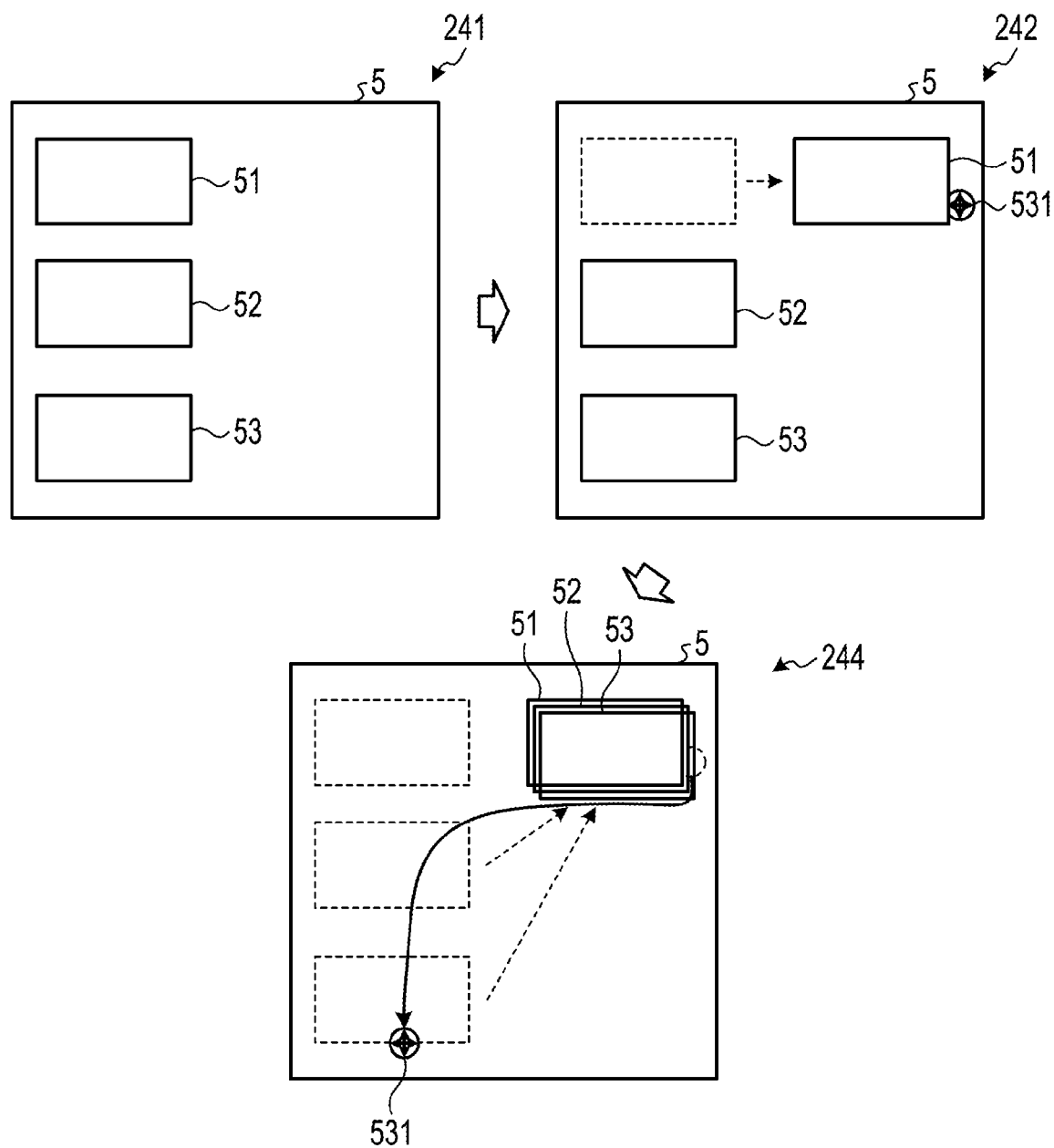
FIG. 11 is a diagram illustrating a transition of a screen during an absolute operation by the information processing terminal 1 according to the fifth embodiment.

FIG. 11 is a diagram illustrating the transition of a screen during an absolute operation by the information processing terminal 1 according to the fifth embodiment. A state 244 represents a state of the work screen 5 when the absolute operation is performed. In this case, the card operation unit 113 receives the instruction to apply the operation allocated to the widget 530 to the cards 52 and 53 from the widget superimposition detection unit 122. In addition, the card operation unit 113 applies the operation allocated to the widget 531 to the superimposed cards 52 and 53 so as to move the cards 52 and 53 to the same place as the card 51 as represented in the state 244.

Here, the card operation unit 113 receives in advance a designation as to whether the absolute operation or the relative operation is performed on the cards 52 and 53 on which the widget 531 is superimposed. In addition, the card operation unit 113 receives the instruction from the widget superimposition detection unit 122 and executes a predetermined operation among the relative operation and the absolute operation.

Here, in the embodiment, the relative operation and the absolute operation have been described by using the operation of the movement as an example, but it is possible to select the relative operation and the absolute operation even in other operations. For example, when the size is changed, in the case of the relative operation, the card operation unit 113 changes the sizes of the cards 52 and 53 depending on a ratio after the change relative to the size before the change of the card 51. Contrary to this, in the case of the absolute operation, the card operation unit 113 changes the sizes of the card 52 and 53 to a size which is the same as the size of the card 51 after the change.

As described above, the information processing terminal 1 according to the embodiment successively applies the operation performed for the specific card 50 to a plurality of other cards 50 by using the widget 500 which represents the operation performed for the specific card 50. As a result, the same operation may be collectively applied to the plurality of cards 50 by the simple operation for the widget 500. Therefore, it is possible to enhance the operation efficiency using the work screen 5.

In the embodiment, descriptions have been made on the case where the operation is collectively applied to the plurality of cards 50, but the selection between the relative operation and the absolute operation may also be applied to the case of the first embodiment. Further, as described in the third embodiment, it is also possible to apply the plurality of operations simultaneously to the plurality of cards 50 by using the plurality of widgets 500.

Sixth Embodiment

Next, a sixth embodiment will be described. The information processing terminal 1 according to the embodiment has a function of highlighting another card 50 to which the operation performed for the specific card 50 may be applied by using the widget 500. In the following description, the description of the operation of each unit explained in each embodiment will be omitted.

Figure 12:
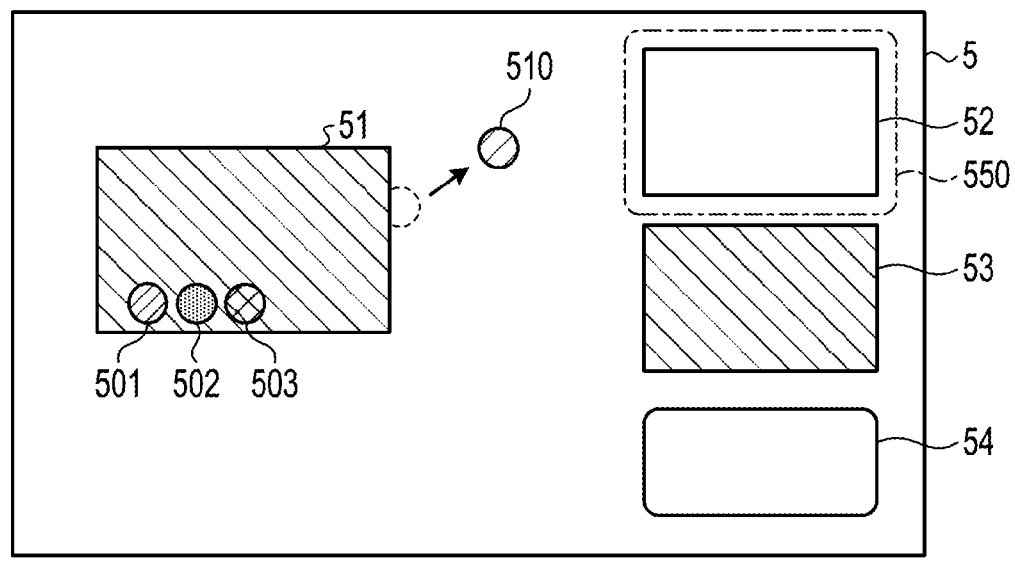
FIG. 12 is a diagram illustrating a screen when a widget 500 is operated by an information processing terminal 1 according to a sixth embodiment.

FIG. 12 is a diagram illustrating a screen when a widget 500 is operated by an information processing terminal 1 according to a sixth embodiment. Here, descriptions will be made on a case where the cards 51 to 54 exist as the card 50 and the widget 510 is generated as the widget 500. The cards 52 and 53 are objects generated by the same application as the card 51. Further, the card 54 is an object generated by a different application from the card 51. As a result, the operation performed for the card 51 may not be accepted by the card 54.

The widget operation unit 124 acquires information on the operation of drag-and-drop of the widget 510 from the widget operation acquisition unit 121. Next, the widget operation unit 124 acquires from the operation recording unit 123 that the operation for the widget 510 is an operation of changing the card 51 to the blue color. Further, the widget operation unit 124 acquires information on the cards 52 to 54 from the server 4.

The widget operation unit 124 determines to which card of the cards 52 to 54 the operation allocated to the widget 510 may be applied. Specifically, the widget operation unit 124 determines that the card 54 is the object generated by the different application from the card 51 and that the operation to change to the blue color is not accepted. In addition, the widget operation unit 124 does not accept the operation of changing the color to the blue color because the card 53 is already blue. Therefore, the widget operation unit 124 determines that the card 52 is an object to which the operation allocated to the widget 510 may be applied.

The widget operation unit 124 highlights the object to which the operation allocated to the widget 510 may be applied. For example, the widget operation unit 124 surrounds the card 52 with a frame 550 indicating that the card 52 is the object to which the operation allocated to the widget 510 may be applied.

As described above, when the information processing terminal 1 according to the present embodiment applies the operation to another card 50 using the widget 500, the information processing terminal 1 highlights the card 50 to which the operation may be applied. As a result, the operator may easily verify that the operation allocated to the widget 500 may be applied among the cards 50 displayed on the work screen 5. That is, the operator may easily determine the object to which the operation allocated to the widget 510 is applied and quickly apply the same operation to another card 50. Therefore, it is possible to enhance the operation efficiency using the work screen 5.

Distribution and Integration

Respective components of each apparatus illustrated in the drawings need not particularly be configured as physically illustrated. That is, a concrete form of distribution and integration of each apparatus is not limited to the illustration and all or a portion thereof may be configured to be functionally or physically distributed and integrated by a predetermined unit depending on various loads or use situations. For example, the card operation controller 11, the widget operation controller 12, and the display controller 13 are respectively provided by different devices, and cooperate with each other in connection with a network to implement the function of the information processing terminal 1.

Information Processing Program

Various processing described in the embodiment may be implemented by executing a program prepared in advance by a computer such as a personal computer or a workstation. Therefore, hereinafter, with reference to FIG. 13, descriptions will be made on an example of the computer that executes an information processing program having the same function as the embodiment.

Figure 13:
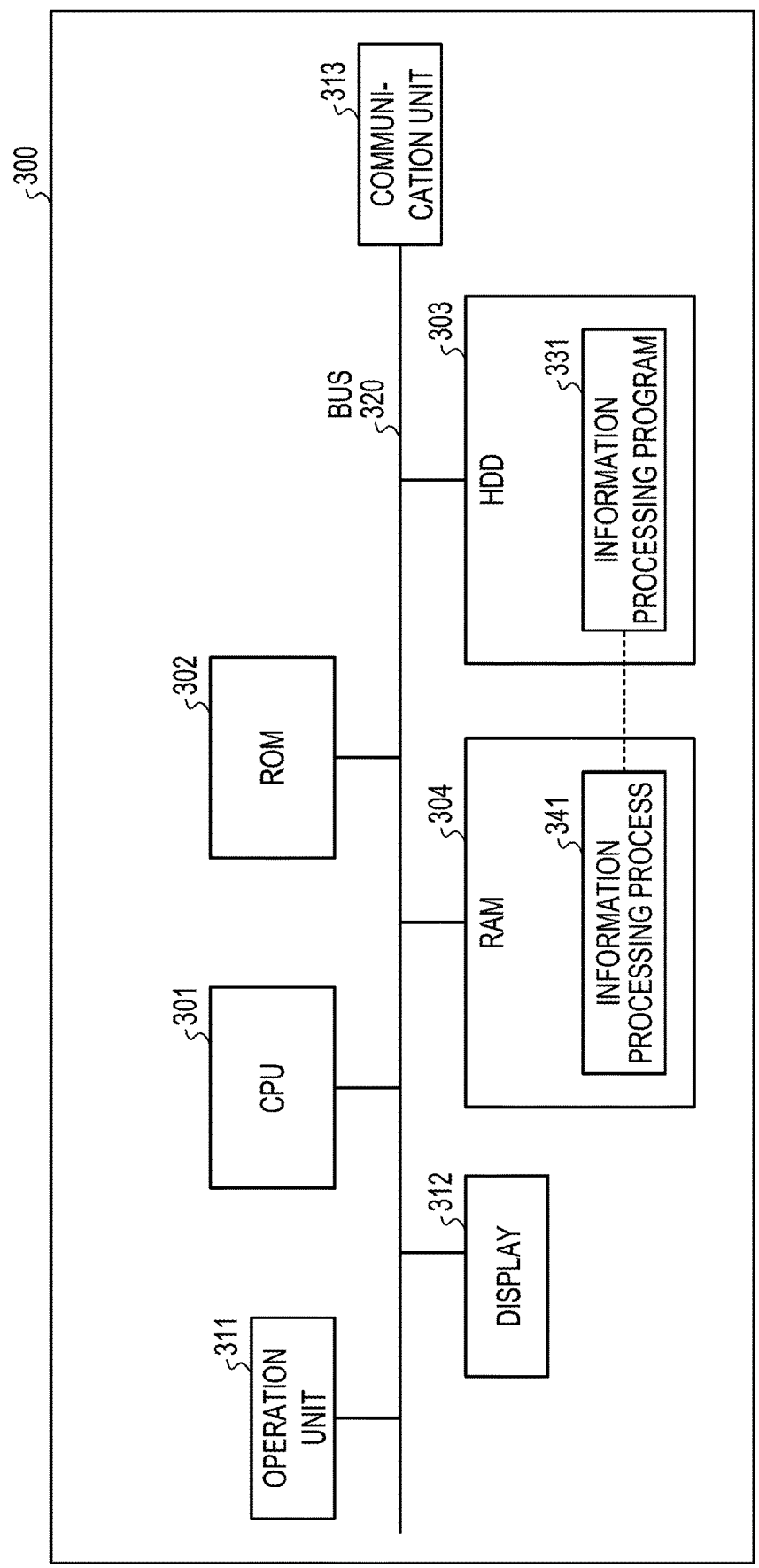
FIG. 13 is a diagram illustrating a hardware configuration example of a computer executing an information processing program according to an embodiment.

FIG. 13 is a diagram illustrating a hardware configuration example of a computer executing an information processing program according to an embodiment. As illustrated in FIG. 13, a computer 300 includes an operation unit 311, a display 312, and a communication unit 313. Further, the computer 300 includes a central processing unit (CPU) 301, a read only memory (ROM) 302, a hard disk drive (HDD), and a random access memory (RAM) 304. The CPU 301, the ROM 302, the HDD 303, the RAM 304, the operation unit 311, the display 312, and the communication unit 313 are connected via a bus 320.

As illustrated in FIG. 13, the HDD 303 stores an information processing program 331 that performs the same functions as the card operation controller 11, the widget operation controller 12, and the display controller 13 described in the above embodiment. The information processing program 331 may be integrated or separated like the respective components of the card operation controller 11, the widget operation controller 12 and the display controller 13 illustrated in FIG. 2. That is, the HDD 303 may not particularly store all data described in the first embodiment and the data used for the processing may be stored in the HDD 303.

Under such circumstances, the CPU 301 reads the information processing program 331 from the HDD 303 and loads the information processing program 331 to the RAM 304. As a result, the information processing program 331 serves as an information processing process 341 as illustrated in FIG. 13. The information processing process 341 loads various data read from the HDD 303 to an area allocated to the information processing process 341 among memory areas of the RAM 304, and executes various processing by using the loaded various data. For example, an example of the process executed by the information processing process 341 includes the process illustrated in FIGS. 4 and 5. Further, in the CPU 301, all processing units described in the embodiment may not particularly operate and a processing unit corresponding to a processing to be executed may be virtually implemented.

The information processing program 331 may not particularly be stored in the HDD 303 or the ROM 302 for the first time. For example, the information processing program 331 is stored in a flexible disk inserted into the computer 300, that is, a so called "portable physical medium". Examples of the portable physical medium include a floppy disk (FD), a compact disk (CD)-ROM, a digital versatile disc (DVD), a magneto optical disk, and an integrated circuit (IC) card. In addition, the computer 300 may acquire the information processing program 331 from the portable physical media and execute the acquired information processing program 331. Further, the information processing program 331 may be stored in another computer or server apparatus connected to the computer 300 via, for example, a public line, the Internet, a LAN, and a WAN, and the computer 300 may acquire the information processing program 331 from another computer or server apparatus and execute the acquired information processing program 331.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and the processor configured to:
  perform a first operation for a first object that is displayed on a screen;
  generate a third object that represents the first operation after performing the first operation;
  display the third object on the screen in association with the first object after performing the first operation for the first object;
  superimpose the third object on one of at least one second object that is displayed on the screen; and
  apply the first operation that is performed for the first object to the one of at least one second object after superimposing the third object on the one of at least one second object.

2. The information processing apparatus according to claim 1, wherein the processor is further configured to:
separate the third object from the one of at least one second object and subsequently superimpose the third object again on the one of at least one second object; and
undo the application of the first operation to the one of at least one second object after superimposing the third object again on the one of at least one second object.

3. The information processing apparatus according to claim 1, wherein the processor is further configured to:
perform a second operation for the first object after performing the first operation for the first object; and
display a fourth object in association with the first object in addition to the third object after performing the second operation for the first object, wherein the fourth object represents the second operation.

4. The information processing apparatus according to claim 3, wherein the processor is further configured to:
superimpose the third object and the fourth object together on the one of at least one second object; and
sequentially apply the first operation and the second operation to the one of at least one second object after superimposing the third object and the fourth object together on the one of at least one second object.

5. The information processing apparatus according to claim 1, wherein the processor is further configured to:
superimpose the third object on the first object; and
return the first object to a state before the first operation is performed for the first object after superimposing the third object on the first object.

6. The information processing apparatus according to claim 1, wherein the processor is further configured to:
superimpose the third object on a plurality of second objects included in the at least one second object; and
apply the first operation to the plurality of second objects after superimposing the third object on the plurality of second objects.

7. The information processing apparatus according to claim 1, wherein the processor is further configured to:
perform the application of the first operation to the one of at least one second object by applying a relative change in a state of the first object, from a first state before performing the first operation to a second state after performing the first operation, to the one of at least one second object.

8. The information processing apparatus according to claim 1, wherein the processor is further configured to:
perform the application of the first operation to the one of at least one second object by changing the one of at least one second object to a state of the first object after performing the first operation.

9. The information processing apparatus according to claim 1, wherein the processor is further configured to:
display an applicable object and an inapplicable object on the screen to be distinctive with each other by an operator before moving the third object, wherein the first operation is applicable to the applicable object and inapplicable to the inapplicable object, and the applicable object includes the one of at least one second object.

10. The information processing apparatus according to claim 1, wherein the processor is further configured to:
perform the display of the third object on the screen in association with the first object by displaying the third object in contact with the first object.

11. The information processing apparatus according to claim 1, wherein the processor is further configured to:
erase the third object when no operation is performed for the third object for a predetermined period after displaying the third object on the screen.

12. The information processing apparatus according to claim 1, wherein the processor is further configured to:
store a correspondence between a predetermined area displayed on the screen and an operator; and
cause an external apparatus corresponding to the operator to store information on an object displayed in the predetermined area.

13. A non-transitory computer-readable recording medium having stored therein a program that causes a computer to execute a process, the process comprising:
performing a first operation for a first object that is displayed on a screen;
generating a third object that represents the first operation after performing the first operation;
displaying the third object on the screen in association with the first object after performing the first operation for the first object;
superimposing the third object on one of at least one second object that is displayed on the screen; and
applying the first operation that is performed for the first object to the one of at least one second object after superimposing the third object on the one of at least one second object.

14. An information processing method comprising:
performing, by a computer, a first operation for a first object that is displayed on a screen;
generating a third object that represents the first operation after performing the first operation;
displaying the third object on the screen in association with the first object after performing the first operation for the first object;
superimposing the third object on one of at least one second object that is displayed on the screen; and
applying the first operation that is performed for the first object to the one of at least one second object after superimposing the third object on the one of at least one second object.

* * * * *